US008089641B2

(12) United States Patent
Idehara

(10) Patent No.: US 8,089,641 B2
(45) Date of Patent: Jan. 3, 2012

(54) IMAGE PROCESSING APPARATUS AND IMAGE FORMING APPARATUS

(75) Inventor: Takenori Idehara, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1100 days.

(21) Appl. No.: 11/438,350

(22) Filed: May 23, 2006

(65) Prior Publication Data

US 2007/0177821 A1   Aug. 2, 2007

(30) Foreign Application Priority Data

Jan. 30, 2006  (JP) .................................. 2006-020990

(51) Int. Cl.
G06K 9/60 (2006.01)
G06K 9/36 (2006.01)
G06K 15/02 (2006.01)
G06F 3/12 (2006.01)
H04N 1/46 (2006.01)

(52) U.S. Cl. ....... 358/1.13; 358/1.2; 358/1.15; 358/530; 382/276; 382/302

(58) Field of Classification Search .................. 358/504, 358/530, 539, 1.15, 1.16, 1.17, 501, 505; 382/232, 276, 302, 303, 304, 305, 308; 375/240, 375/242, 240.25
See application file for complete search history.

(56) References Cited

U.S. PATENT DOCUMENTS

| | | | | |
|---|---|---|---|---|
| 4,998,213 A * | 3/1991 | Suzuki et al. | ................ | 358/1.13 |
| 5,237,655 A * | 8/1993 | Statt et al. | ..................... | 345/504 |
| 5,509,115 A * | 4/1996 | Butterfield et al. | ........... | 345/418 |
| 5,574,834 A * | 11/1996 | Horie et al. | ................... | 358/1.15 |
| 6,181,341 B1 * | 1/2001 | Shinagawa | ..................... | 715/734 |
| 6,222,636 B1 * | 4/2001 | Gerstenberger | ............. | 358/1.15 |
| 6,289,138 B1 * | 9/2001 | Yip et al. | ....................... | 382/307 |
| 6,456,390 B1 * | 9/2002 | Okubo et al. | ................ | 358/1.17 |
| 6,529,289 B1 * | 3/2003 | Konno et al. | ................ | 358/1.17 |
| 6,674,536 B2 * | 1/2004 | Long et al. | ................... | 358/1.15 |

(Continued)

FOREIGN PATENT DOCUMENTS

JP   63-086081   4/1988

(Continued)

OTHER PUBLICATIONS

Japanese Office Action dated Mar. 31, 2009.

(Continued)

*Primary Examiner* — James A Thompson
*Assistant Examiner* — Jonathan Beckley
(74) *Attorney, Agent, or Firm* — Finnegan, Henderson, Farabow, Garrett & Dunner, LLP

(57) ABSTRACT

Disclosed is an image processing apparatus including: a controller for generating expanded image data; a local bus connected with the controller; a plurality of generic buses which are independent from each other; a plurality of image processing sections, each of which is respectively connected to each of the plurality of generic buses, for executing image processing of the expanded image data to generate processed image data; a plurality of bridges, each of which connects the local bus with each of the plurality of independent generic buses; and a memory section for storing at least one of the expanded image data and the processed image data, wherein the plurality of image processing sections share execution of image processing of the expanded image data generated by the controller, and the memory section memorizes the processed image data.

15 Claims, 22 Drawing Sheets

U.S. PATENT DOCUMENTS

| | | | | |
|---|---|---|---|---|
| 6,944,682 B2 * | 9/2005 | Tanaka | ............................ | 710/22 |
| 7,003,701 B2 * | 2/2006 | Ohwada | ......................... | 714/43 |
| 7,031,003 B2 * | 4/2006 | Nagai et al. | ................... | 358/1.13 |
| 7,099,042 B2 * | 8/2006 | Yaguchi | ......................... | 358/1.9 |
| 7,107,384 B1 * | 9/2006 | Chen et al. | .................... | 710/309 |
| 7,130,072 B2 * | 10/2006 | Suzuki et al. | ................ | 358/1.15 |
| 7,193,738 B2 * | 3/2007 | Yuasa | .......................... | 358/1.15 |
| 7,315,388 B2 * | 1/2008 | Fujiwara et al. | ............. | 358/1.15 |
| 7,352,480 B2 * | 4/2008 | Abe | ............................. | 358/1.13 |
| 7,362,471 B2 * | 4/2008 | Date | ............................. | 358/2.1 |
| 7,535,592 B2 * | 5/2009 | Niitsuma | ..................... | 358/1.16 |
| 7,580,151 B2 * | 8/2009 | Kurose et al. | .................. | 358/1.9 |
| 7,580,581 B2 * | 8/2009 | Namera et al. | ............... | 382/232 |
| 2003/0044092 A1 * | 3/2003 | Tanaka | ......................... | 382/325 |
| 2005/0168770 A1 | 8/2005 | Kurose et al. | | |

FOREIGN PATENT DOCUMENTS

| | | |
|---|---|---|
| JP | 02-126372 | 5/1990 |
| JP | 9-251439 | 9/1997 |
| JP | 2002-264400 | 9/2002 |
| JP | 2002-351820 | 12/2002 |
| JP | 2005-128632 | 5/2005 |
| JP | 2005-332298 | 12/2005 |

OTHER PUBLICATIONS

Japanese Office Action dated Jun. 30, 2009.

* cited by examiner

IMAGE PROCESSING APPARATUS AND IMAGE FORMING APPARATUS

CROSS REFERENCE TO RELATED APPLICATION

The present application is based on Japanese Patent Application No. 2006-020990 filed with Japan Patent Office on Jan. 30, 2006, the entire content of which is relied on to correct translation errors in the present application.

BACKGROUND OF THE INVENTION

1. Field of the Invention

The present invention relates to an image processing apparatus and an image forming apparatus. Particularly the present invention relates to the image processing apparatus or the image forming apparatus in which the image processing section is connected with generic bus.

2. Description of Related Art

In the image processing apparatus and the image forming apparatus, various interface controls and relatively high-speed data transmission have been attained by proving high-speed local bus for a CPU and separately proving generic bus such as PCI bus.

FIG. 17 illustrates a block diagram to show a configuration of a conventional image forming apparatus. In FIG. 17 connected with local bus 100A, which is an external bus of the CPU 101, are a CPU 101 as a controller, a ROM 102 for memorizing various setting data as a memory, a RAM 103 for memorizing image data as a memory (an image memory) in which data can be rewritten and an interface section 105 including a UART for communicating with the outside of the image forming apparatus and an I/F section 105 such as LAN interface.

A USB I/F section 111, an IDE I/F section 112 and the UART 113 are connected with PCI bus #0 (it will be called PCI bus 100B hereinafter) as generic bus or expansion bus, which is different from the local bus 100A described above. The PCI bus 100B is connected with the local bus 100A through a PCI bridge #0 (it will be called PCI bridge 107 hereinafter).

An Image processing section 120 for executing image processing to image data is connected with PCI bus #1 (it will be called PCI bus 100C) as generic bus or expansion bus, which is different from the local bus 100A. The PCI bus 100C is connected with the local bus 100A described above through a PCI bridge #1 (it will be called PCI bridge 108). A printer engine 140 for forming an image on a recording paper is connected with the image processing section 120.

In the image processing apparatus and the image forming apparatus, the CPU and the image memory are connected with local bus which is substantially the same as the external bus of a CPU. Meanwhile, the image processing section and other devices are connected with generic bus. In many case, the local bus and the generic bus are connected each other through a bridge.

In recent years, in order to improve printing performances and to change a printing method in the image forming apparatus, a part of image processing is executed by a hardware-based image processing section. At present, it is thought that to improve the image processing performance is necessary. However, the data transmission bandwidth of the generic bus with which the image processing section of the image forming apparatus is connected is a bottleneck for high-speed data transmission.

In order to resolve the problems, it is feasible to design a North-chip having dedicated high-speed bus and to develop a high-speed hardware connecting with an image processing hardware, or to develop a controller in which a North-chip having the latest and high-speed generic bus is used.

Since the many hours and the large man-hour to develop the hardware having a high-speed dedicated bus are needed, it is not suitable for the products requiring short-developing terms. The cost of the North-chip having high-speed generic bus therein is higher comparing with that of a North-chip having the most widely spread generic bus. Since the adoption of the North-chip having the latest high-speed generic bus is difficult for a printer in the lowest priced segment due to the cost restriction, and the printing speed of the printer is low, the high-speed bus is not necessary. Consequently, when developing the image processing hardware having a high-speed generic bus, it is necessary to separately develop a different image processing hardware for the printer in the lowest priced segment.

In the technologies associated with the image forming apparatus disclosed in FIG. 1 and in the first page of Japanese Patent Application Open to Public Inspection No. H9-251439, adopted is a method for improving the efficiency by way of transmitting the same data at a time through a multicast circuit to a plurality of targets connected with the same PCI bus. In this case, there is a problem that the limitation of data transmission is limited by the limitation of the data transmission speed of PCI bus. Further, only the same data can be sent to two targets. Accordingly, when conducting image processing in the image processing section connected with the PCI bus, the bandwidth of the PCI bus becomes a bottleneck and it is not feasible to resolve the problems, which become obstacles of high-speed data transmission.

In the technologies disclosed in FIG. 1 and page 1 of Japanese Patent Application Open to Public Inspection No. 2002-264400, scanned image data is memorized in the memory through PCI bus and the memorized image data is also outputted through the PCI bus. In this case, a controller efficiently controls the PCI bus by providing a buffer in front of the PCI bus for the scanned image data and memorized image data for printing to decrease the occupancy time of the PCI bus. This is an invention for efficiently controlling one PCI bus. Accordingly, it is impossible to resolve the problem that when conducting the image processing in the image processing section connected with PCI bus, the data transmission bandwidth of PCI bus becomes a bottleneck and the obstacle for high-speed data transmission.

The image data flow and the cause of the obstacle to high-speed data transmission, resulted from the bottleneck of PCI bus bandwidth will be describe below in detail by referring to flowcharts shown in FIG. 18 and FIG. 19 onward, which are detailed drawing of the block diagram shown in FIG. 17.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Firstly, the. CPU 101 determines whether a space area of an expanded band area in the RAM 103 for storing bitmap image data is available (Step S1 in FIG. 19). If there is the space area for storing bitmap image data (Step S1: YES in FIG. 19), the CPU 101 allows the RAM 103 to store the bitmap image data per a band (Step S2 in FIG. 19, (a) in FIG. 18).

Here, the CPU 101 checks the operation state of an image processing section 120 (Step S3 in FIG. 19). The image processing section 120 comprises an image transform processing A for generating processed image data having a compressed bitmap format by compressing image data having an expanded bitmap format and an image transformation processing B for generating output image data from the processed image data.

When the image processing section 120 stays in a state that the image transformation processing A has completed (under the condition that image transformation processing has completed)(Step S3: YES in FIG. 19), the CPU 101 requests the image forming section 120 to start image transform processing A (Step S4 in FIG. 19).

Here, the image processing section 120 shifts to an image transform processing execution state (Step S11 in FIG. 20). Then the image processing section 120 reads out the band bitmap image data from the RAM 103 (S12 in FIG. 20). Namely, bitmap image data per a band are transferred in a DMA mode from the RAM 103 to the image processing section 120 through the Local bus 100A, the PCI bridge 108 and the PCI bus 100C ((b) in FIG. 18).

Then, the image processing section 120 executes image processing (Step S13 in FIG. 20) and compression processing (S14 in FIG. 20) to the bitmap image data per a band, and generates the compressed bitmap image data as processed image data.

Here, the image processing section 120 stores the compressed bitmap image data generated from the bitmap image data per a band into the compressed bitmap image data area of the RAM 103 (Step S15 in FIG. 20). Namely, the compressed bitmap image data per a band is transmitted in a DMA mode from the image processing section 120 to the RAM 103 through the PCI bus 100C, the PCI bridge 108 and the local bus 100A ((C) in FIG. 18.). Then, the state of the image processing section 120 shifts to an image transform processing finished state (Step S16 in FIG. 20).

The CPU 101 deletes the bitmap image data per a band stored in the RAM 103 after DMA transmission (Step 12 in FIG. 20) has completed. Or the CPU 101 deletes the bitmap image data per a band, which have been transmitted by a move operation, not a copy opertion of the image data when the image processing section 120 reads the image data.

Further, the CPU 101 generates expanded bitmap image data of a plurality of bands corresponding to one page image data. The CPU 101 determines that whether the CPU has completed the generation of bitmap image data of all the bands in the one page (Step S5 in FIG. 19).

If the CPU 101 has not completed the generation of bitmap image data of all bands in one page (Step S5: NO in FIG. 19), the CPU 101 further determines whether the space area for storing the bitmap image data in the expanded band area (Step S1 in FIG. 19) in the RAM 103. If the space area is available (Step S1: YES in FIG. 19), the CPU 101 stores the bitmap image data of a next band unit into the RAM 103 (Step S2 in FIG. 19 and (a) in FIG. 18).

Then, the CPU 101 repeats the determination of operation status of the image processing section 120 (Step S3 in FIG. 19), the request of image transform processing to the image processing section 120 (Step S4 in FIG. 19) and image transformation processing in the image processing section 120 (Steps S11-S16 in FIG. 20). Those operations will be executed over the bitmap image data of the all bands in a page per a band.

When the CPU 101 has completed the image transform processing per a band of all band bitmap image data in one page (Step S5: YES and Step S6: YES in FIG. 19), the CPU 101 requests the image processing section 120 to start an image output processing 1 to (Step S7 in FIG. 19). Here, the image processing section 120 has a function to transmit the compressed bitmap image data from the RAM 103 to a printer engine 140 other than the image transform processing (generation of compressed image data) described above.

Here, the CPU 101 checks the operation status of the image processing section 120 (Step S21 in FIG. 21). If the image processing section 120 has not completed the image output processing, the CPU 101 stands by and waits for the start of image output processing (Step 21: NO in FIG. 21). If the image processing section 120 has completed the image output processing (Step 21: YES in FIG. 21), the CPU 101 issues a request for starting image output processing B to the image processing section 120 (Step S22 in FIG. 21). The CPU 101 comes back to Step 1 to check the operation status of the image processing section 120 when there is a request of an image output processing (Step 23: YES in FIG. 21), otherwise (Step 23: No in FIG. 21), completes the image output processing 1.

Here, the image processing section 120 shifts to an image output processing execution state (Step S31 in FIG. 22). And the image processing section 120 reads out the compressed bitmap image data from the RAM 103 (Step S32 in FIG. 22).

And the image processing section 120 transmits the compressed bitmap image data to the printer engine 140 from a video port a page by a page and a color by a color corresponding to image formation of the printer engine 140 (Step 33 in FIG. 22). When completing the transmission of one page compressed image data, the image processing section 120 shifts to the image output completing state (Step S34 in FIG. 22) The CPU 101 determines whether there are next image data when completing the image formation of all the one page image data (Step S8 in FIG. 19). Here, if there are next data (Step S8: YES in FIG. 19), then the CPU 101 repeats the steps from step 1 in FIG. 19. And if there are no image data (Step S8: No in FIG. 19), the CPU 101 finishes the processing and comes to a completion state.

When executing an image formation of a plurality of pages of images in the configurations and operations described above, the image processing section 120 generates compressed bitmap image data while the printer engine 140 is executing image formation.

Namely, data transmission of three systems, such as reading out bitmap image data from the RAM 103 ((b) in FIG. 18), writing compressed bitmap image data onto RAM 103 ((c) in FIG. 18) and reading out the compressed bitmap image data from RAM 103 ((e) in FIG. 18) through the PCI bridge 108 and the PCI bus 100C are executed at substantially the same time.

The applicants of the present application have revealed through their study that by this reason the data transmission speed (bandwidths) of the PCI bridge 108 and the PCI bus 100C become an obstacle for high-speed data transmission.

The applicants also have revealed that the productivity of image formation (the number of output sheet of image formation per a unit time) is limited by the data transmission speed (bandwidth) of the PCI bridge 108 and the PCI bus 100C.

SUMMARY

An object of the present invention is to resolve the problems described above and to provide an image processing apparatus and an image forming apparatus capable of improving the image processing speed without changing the generic bus to high-speed generic bus in an apparatus having an image processing section connected with the generic bus.

In accordance with one aspect of the present invention, an image processing apparatus comprises a controller for generating expanded image data; a local bus connected with the controller; a plurality of generic buses which are independent from each other; a plurality of image processing sections, each of which is respectively connected to each of the plurality of generic buses, for executing image processing of the expanded image data to generate processed image data; a plurality of bridges, each of which connects the local bus with each of the plurality of independent generic buses; and a memory section for storing at least one of the expanded image data and the processed image data, wherein the plurality of image processing sections share execution of image processing of the expanded image data generated by the controller, and the memory section memorizes the processed image data.

In accordance with another aspect of the present invention, an image forming apparatus comprises a controller for generating expanded image data; a local bus connected with the controller; a plurality of independent generic buses which are independent from each other; a plurality of image processing sections, each of which is respectively connected to each of the plurality of generic buses, for executing image processing of the expanded image data to generate processed image data; a plurality of bridges, each of which connects the local bus with each of the plurality of generic buses; a memory section for storing at least one of the expanded image data and the processed image data; and an image forming section connected to any one of the plurality of image processing sections, wherein the plurality of image processing sections share execution of image processing of the expanded image data generated by the controller, and the memory section memorizes the processed image data.

BRIEF DESCRIPTION OF THE DRAWINGS

These and other objects, advantages and features of the invention will become apparent from the following description thereof taken in conjunction with the accompanying drawings in which.

DETAILED DESCRIPTION OF THE PREFERRED EMBODIMENT

The most preferable embodiment of the present invention will be described in detail below by using drawings. The configurations and the operations of an image processing apparatus and an image forming apparatus will be described by using an embodiment below. However, in some cases described below, the image processing method and the image forming method denote the operations of the image processing apparatus and the image forming apparatus.

The image forming apparatus is configured by adding an image forming section for forming an image to an image processing apparatus for executing image processing. Embodiments of the present invention will be described below by using examples of image forming apparatuses.

The First Embodiment

Figure 1:
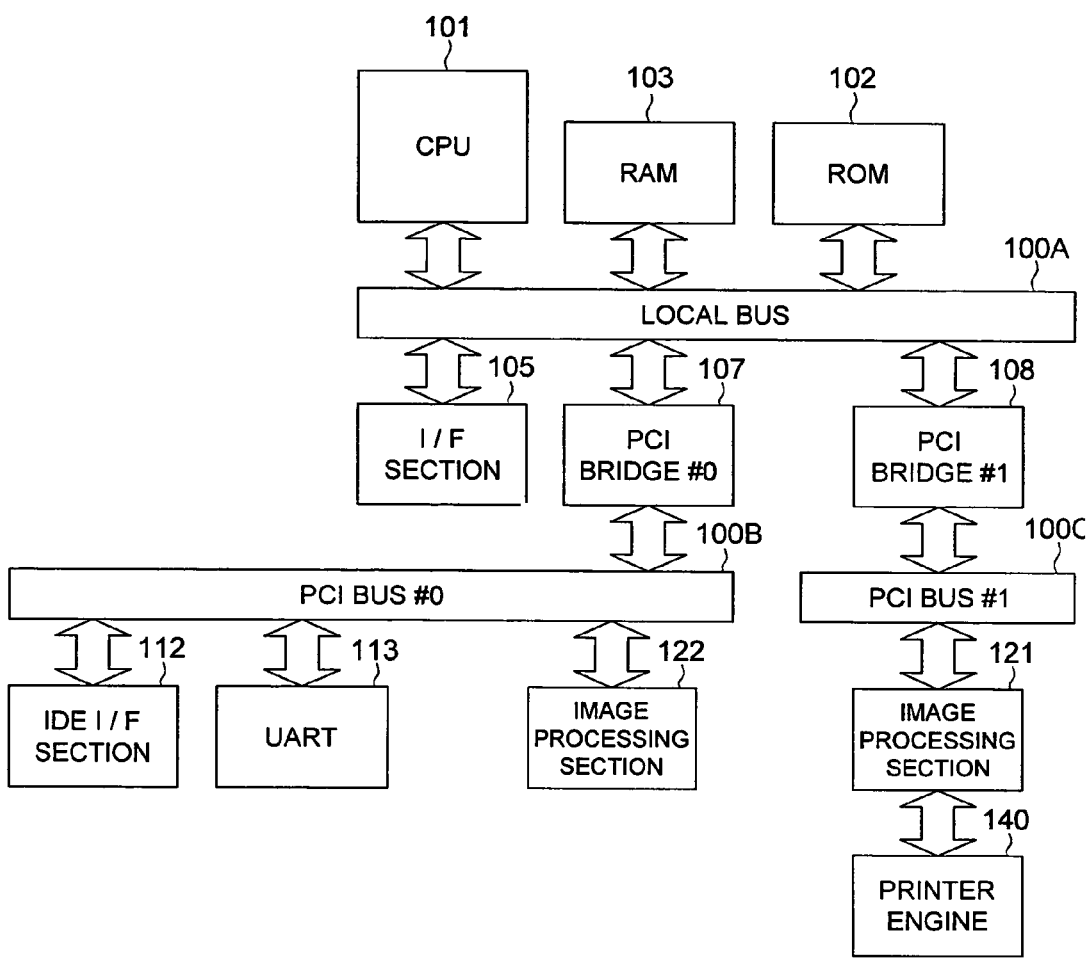
FIG. 1 illustrates a block diagram of the configuration of an image forming apparatus of the first embodiment of the present invention.

FIG. 1 illustrates a block diagram of the configuration of an image forming apparatus of the first embodiment of the present invention. In FIG. 1, a CPU 101 as a controller, a ROM 102 as memory for storing various setting data, a RAM 103 as memory (image memory) capable of being rewritten for memorizing image data, and an I/F section being a UART for communicating with the outside of the image forming apparatus and a LAN interface are connected with a local bus 100A which uses an external bus of the CPU 101 as it is.

An IDE I/F section 112, a UART 113 for serial communication and an image processing section 122 for executing an image processing of image data as an image processing hardware #2 are connected with a PCI bus #0 (it will be called PCI bus 100B from now on) as a generic bus or an expanded bus, which is different from the local bus 100A described above. The PCI bus 100B is connected with the local bus 100A described above through a PCI bridge #0 (it will be called PCI bridge 107 from now on).

An image processing section 121 as an image processing hardware #1 for processing image data is connected with generic bus or PCI bus #1 (it will be called a PCI bus 100C from now on) which is different from the local bus 100A or the PCI bus 100B described above. The PCI bus 100C is connected with the local bus 100A through PCI bridge #1 (it will be called PCI bridge 108 from now on). A printer engine 140 for forming an image onto a recording paper sheet is connected with the image processing section 121.

Various interface-controls and relatively high-speed data transmission have been established by providing high-speed local bus 100A and separately using generic bus such as PCI bus, which is different from the local bus 100A. In general, the local bus 100A has data transmission capability, which is several times higher than those of the PCI buses 100B and 100C.

In the first embodiment, the plurality of image processing sections 121 and 122 are separately connected with the plurality of independent generic buses 100B and 100C. The plurality of image processing sections 121 and 122 has functions for executing a predetermined image process and a predetermined compression process at least to the bitmap image data, and further generating compressed bitmap image data as processed image data.

Here, image data flow and how the high-speed data transmission has been attained without bottleneck caused by the bandwidth of the PCI bus will be described in detail below by using flow charts illustrated in the block diagram of FIG. 2 and flow charts illustrated in FIG. 3 onward indicating detail explanations of the block diagram illustrated in FIG. 1.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Figure 2:
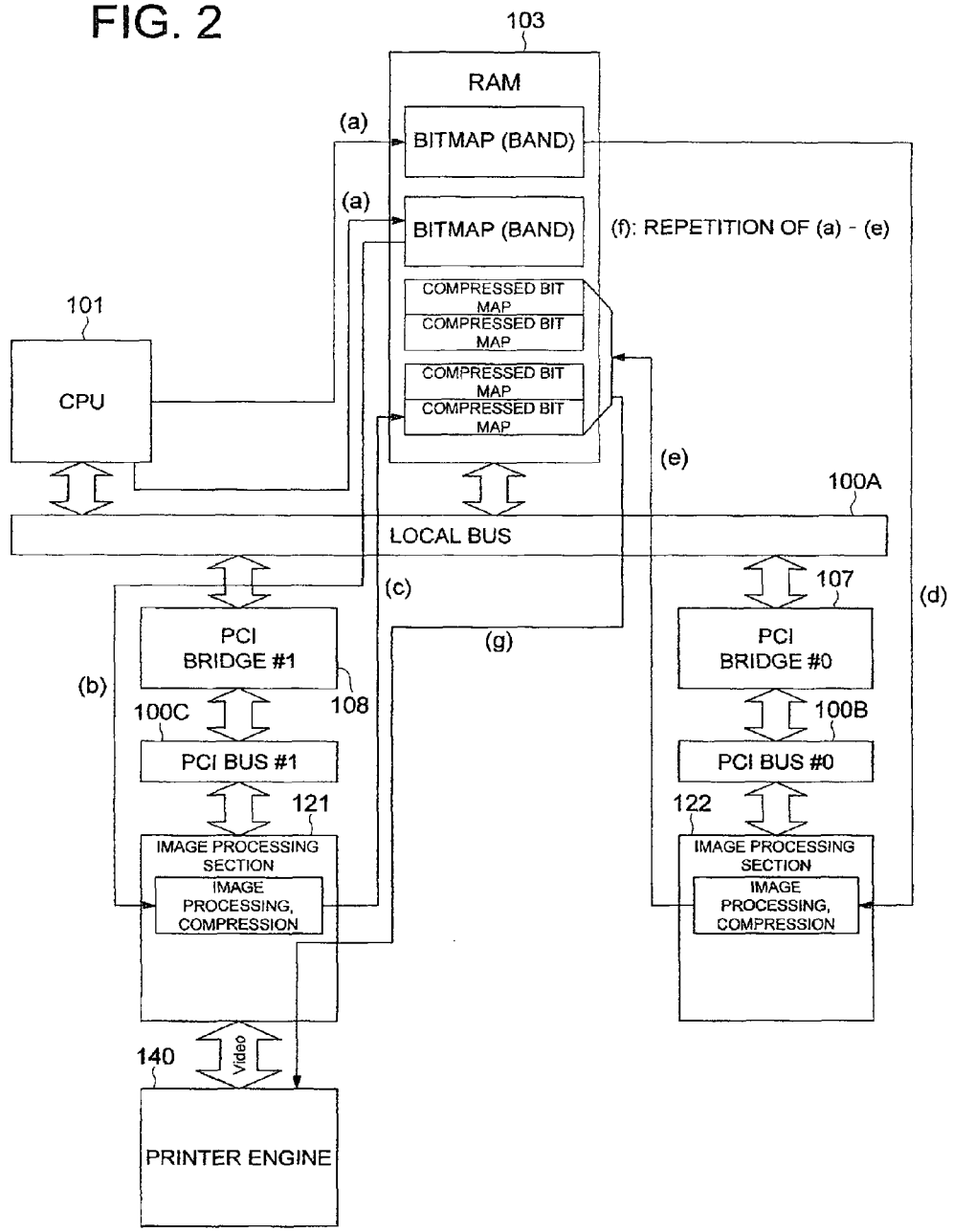
FIG. 2 illustrates a block diagram for showing the configuration and the operations of the image forming apparatus of the first embodiment of the present invention.
Figure 3:
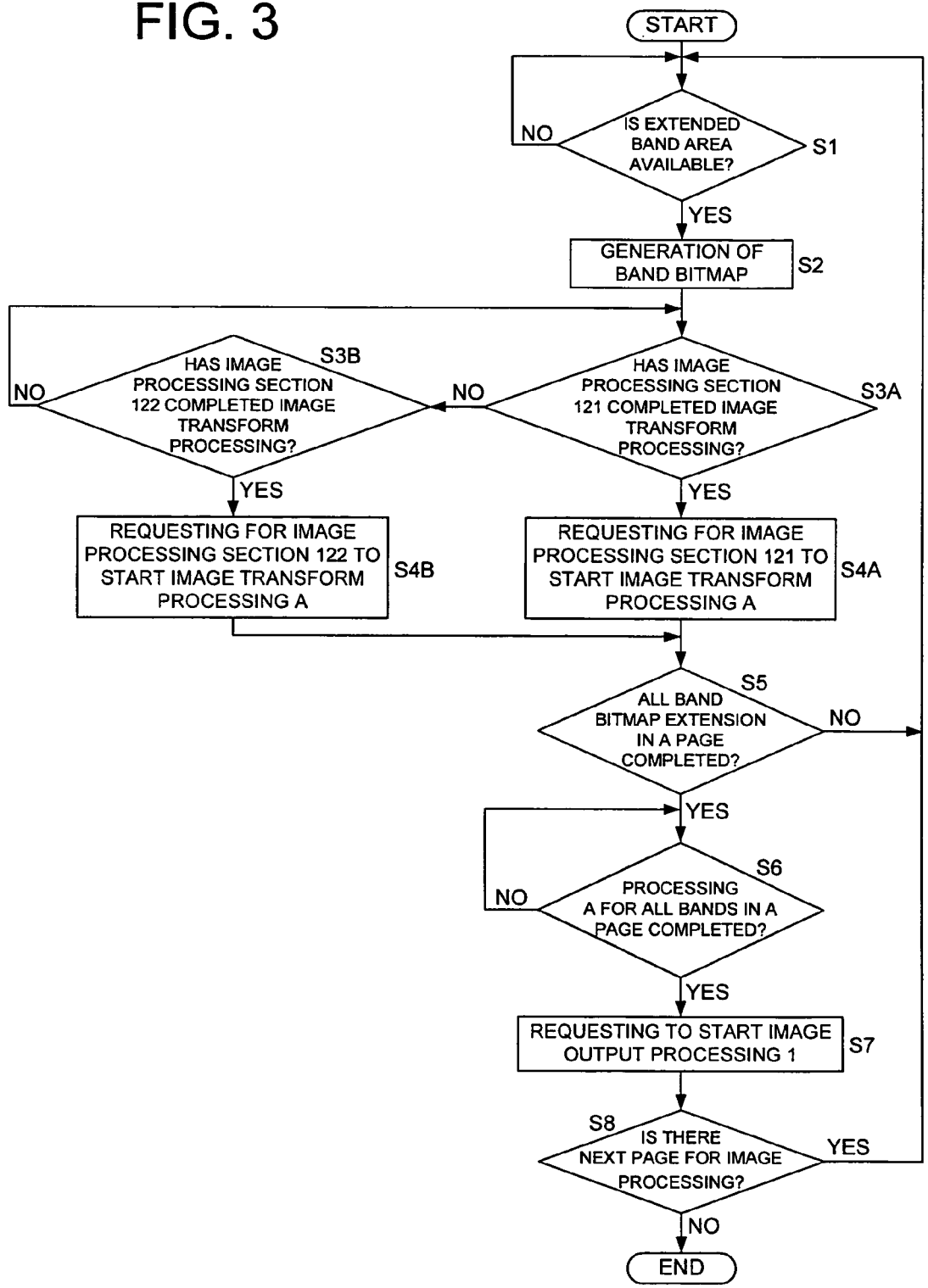
FIG. 3 illustrates a block diagram for showing the operations of the image forming apparatus of the first embodiment of the present invention.

Firstly, the CPU 101 checks whether the space area of an expanded band area in the RAM 103 for storing bitmap image data is available (Step 1: in FIG. 3). If space area is available (Step Si: YES in FIG. 3), then the CPU 101 stores the bitmap image data per a band into the RAM 103 (Step S2 in FIG. 3 and (a) in FIG. 2).

Here, the CPU 101 checks the operation state of the image processing section 121 (Step S3A in FIG. 3). The image processing section 121 has a function for executing an image transform processing A for compressing the expanded bitmap image data to generate processed image data having a compressed bitmap format and a function for executing an image output processing B for generating output image data from the processed bitmap image data having a compressed bitmap format.

When the image processing section 121 is in the state that the image processing section 121 has completed the image transform processing A (image transform processing completion state) (Step S3A: Yes in FIG. 3), the CPU 101 requests the image processing section 121 to start the image transform processing A (Step S4 in FIG. 3).

If the image processing section 121 is not in the state the image processing section 121 has completed the image transform processing A (image transform processing completion state) (Step S3A: NO in FIG. 3), the CPU 101 checks the operation state (Step S3B). The image processing section 122 has a function for executing an image transform processing A for compressing the expanded bitmap image data to generate processed image data having a compressed bitmap format and a function for executing an image output processing B for generating output image data from the processed image data having compressed bitmap format.

If the image processing section 122 is in the state that the image processing section 122 has completed the image transform processing A (image transform processing completion state) (Step S3B: YES in FIG. 3), then the CPU 101 requests the image transform processing A to start image transform processing A (Step S4B in FIG. 3).

Figure 4:
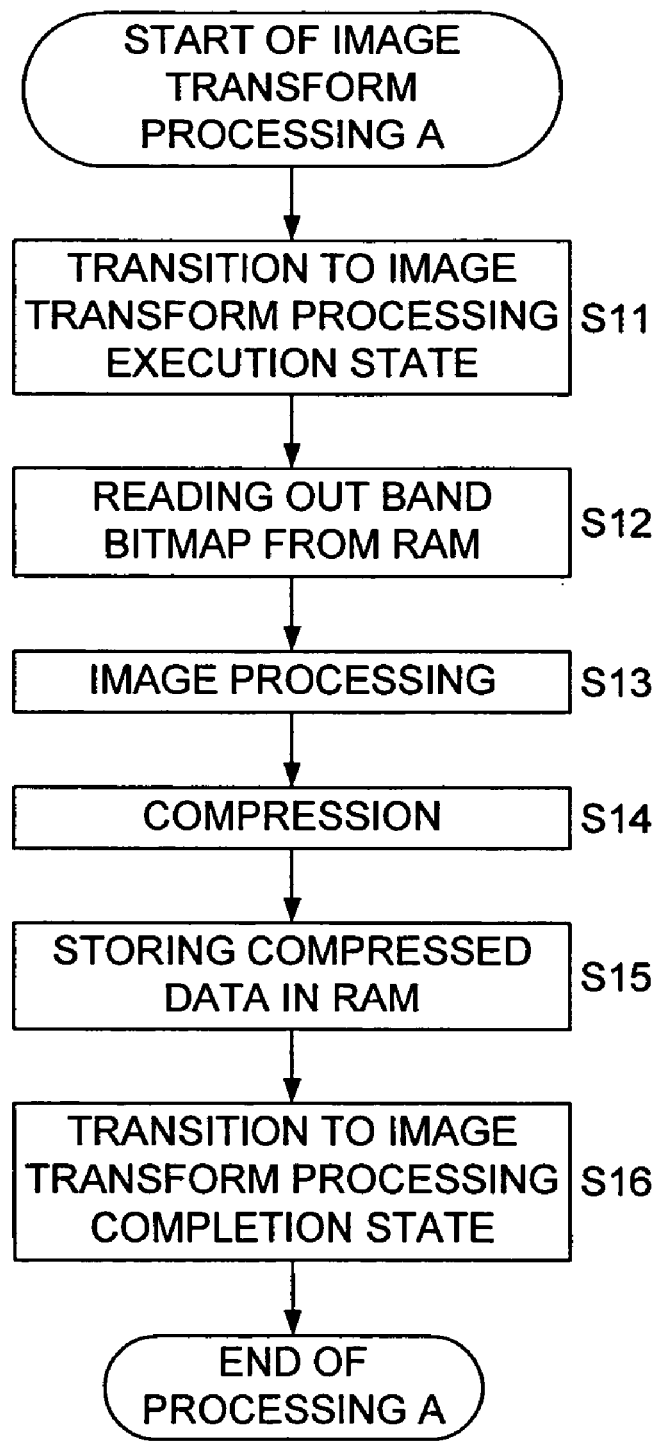
FIG. 4 illustrates a block diagram for showing the operations of the image forming apparatus of the first embodiment of the present invention.

Here, either the image processing section 121 or the image processing section 122 to which the start of the image transform processing A has been requested shifts to the image transform processing execution state (Step S11 in FIG. 4). And the image processing section 121 or 122 reads out bitmap image data per band unit from the RAM 103 (Step S12 in FIG. 4).

Namely, when the CPU 101 issues the request of the image transform processing A to the image processing section 121, the bitmap image data per a band are transmitted from the RAM 103 to the image processing section 121 in a DMA mode through the local bus 100A, the PCI bridge 108 and PCI bus 100C ((b) in FIG. 2).

When the CPU 101 issues the request of the image processing A to the image processing section 122, bitmap image data per a band are transmitted from RAM 103 to the image processing section 122 in a DMA mode through the local bus 100A, the PCI bridge 107 and the PCI bus 100B ((d) in FIG. 2).

The image processing sections 121 and 122 apply predetermined image processing (Step 13 in FIG. 4) and compression processing (Step S14 in FIG. 4) to the bitmap image data per a band and generate compressed bitmap image data as processed image data.

Here, the image processing sections 121 and 122 store the compressed image data generated from the image data per a band having a bitmap format into an area for compressed bitmap image data in the RAM 103 (Step S15 in FIG. 4).

Namely, when the image processing section 121 executes the image processing and the compression processing, compressed bitmap image data per a band are transmitted from the image processing section 121 to the RAM 103 in a DMA mode through the PCI bus 100C, the PCI bridge 108 and the local bus 100A ((c) in FIG. 2). Then, the image processing section 121 shifts to an image transform processing completion state (Step S16 in FIG. 4).

When the image processing section 122 executes the image processing and the compression processing, compressed bitmap image data per a band are transmitted from the image processing section 122 to the RAM 103 in a DMA mode through the PCI bus 100B, the PCI bridge 107 and the local bus 100A ((e) in FIG. 2). Then, the image processing section 122 shifts to an image transform processing completion state (Step S6 in FIG. 4).

The CPU 101 deletes the bitmap image data per a band stored in the RAM 103, which have been transmitted, after the transmission in a DMA mode has been executed (Step S12 in FIG. 4) described above. Otherwise, when the image processing section 121 or 122 reads out the bitmap image data per a band, the CPU 101 deletes the bitmap image data per a band in the RAM 103, which have been transmitted, by way of a move command, not a copy command.

Further, the CPU 101 generates expanded bitmap image data of a plurality of bands corresponding to one page image data. The CPU 101 determines that whether the CPU 101 has completed the generation of bitmap image data of all the bands in the one page (Step S5 in FIG. 3).

If the CPU 101 determines that the CPU 101 has not completed the generation of bitmap image data of all bands in one page (Step S5: NO in FIG. 3), the CPU 101 further checks the space area in the expanded band area for storing bitmap image data in the RAM 103. If the space area is available (Step S1: YES in FIG. 3), the CPU 101 stores the bitmap image data of a next band unit into the RAM 103 (Step S2 in FIG. 3 and (a) in FIG. 2).

Operation state check of the image processing section 121 or 122 by the CPU 101 (Step S3A or S3B in FIG. 3), a request for the image processing section 121 or 122 to start the image transform processing A by the CPU 101 (Step S4A or S4B in FIG. 3) and an image transform processing by the image processing section 121 or 122 (Steps S11-S16 in FIG. 4) are repeated per a band over the bitmap image data of all bands in a page.

In the first embodiment, since when either the image processing section 121 or 122 is in an image processing state, the other image processing section which has completed the image transformation is selected to start the image processing, it becomes possible that a plurality of image processing sections can alternately execute image processing while sharing a processing timing per a band.

When the CPU 101 completes the image transform processing per a band on all band bitmap image data in a page (Step S5 YES and Step S6: YES in FIG. 3), the CPU 101 issues a start-request of an image output processing 1 to the image processing section 121 to which the printer engine 140 is connected (Step S7 in FIG. 3).

The image processing section 121 also has a function for transmitting compressed bitmap image data from the RAM 103 to the printer engine 140 other than the image transform processing function (generation of compressed bitmap image data) described above.

Figure 5:
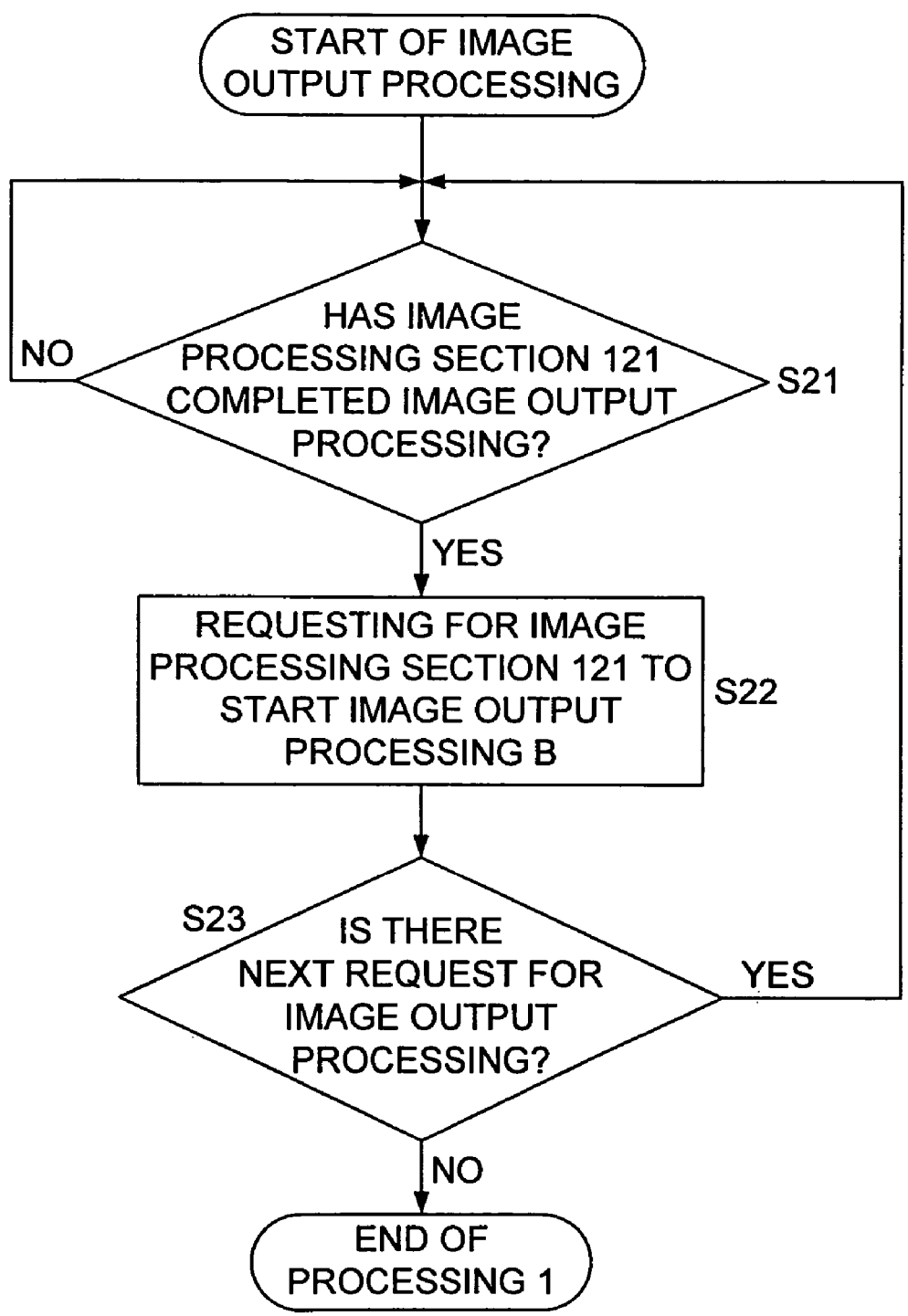
FIG. 5 illustrates a block diagram for showing the operations of the image forming apparatus of the first embodiment of the present invention.

Then, the CPU 101 checks the operation state of the image processing section 121 (Step S21 in FIG. 5). The CPU 101 enters into a standby mode if the image processing section 121 is not in a state where the image processing section 121 has completed image output processing (Step 21: NO in FIG. 5). If the image processing section 121 is in a state where the image processing section 121 has completed image output processing (Step 21: YES in FIG. 5), then the CPU 101 requests the image forming processing 121 to start an image output processing B (Step S21 in FIG. 5). The CPU 101 comes back to the step S1 to check the state of the image processing section 121 if there is a next request for image output processing (Step 23: YES in FIG. 5), and if there is no next request for image output processing (Step S23 in FIG. 5), then the CPU 101 completes the image output processing 1.

Figure 6:
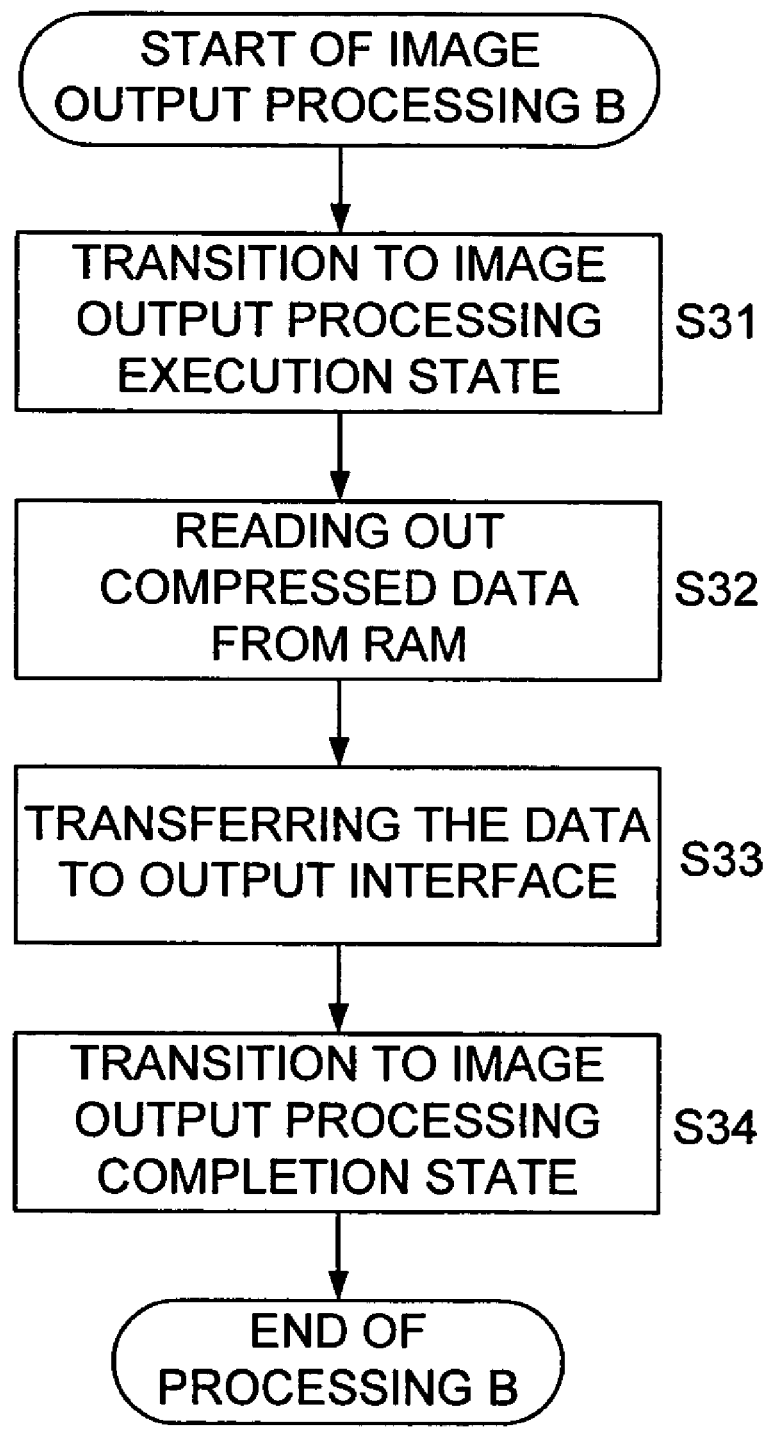
FIG. 6 illustrates a block diagram for showing the operations of the image forming apparatus of the first embodiment of the present invention.

Then, the image processing section 121 shifts to an image output processing execution state (Step S31 in FIG. 6). And the image processing section 121 reads out compressed bitmap image data from the RAM 103 (Step S32 in FIG. 6).

Then, the image processing section 121 transmits the compressed bitmap image data to the printer engine 140 from a video board per a page and a color corresponding to the image formation of the printer engine 140 (Step S33 in FIG. 6). If the image processing section 121 completes the transmission of the one page compressed bitmap image data, the image processing section 121 shifts to an image output processing completion state (Step S34 in FIG. 6).

The CPU 101 checks whether there is next image data when completing the image formation of all one-page image data (Step S8 in FIG. 3). If there is next image data (Step S8: YES in FIG. 3), the CPU 101 repeats the processes from step 1 in FIG. 1. If there is no next image data (Step S8: NO in FIG. 3), the CPU 101 completes all processes and shifts to a completed state.

In the configurations and operations described above, the image processing sections 121 and 122 alternately generate bitmap image data in parallel. As a result, since a plurality of image processing sections 121 and 122 execute image processing while sharing a processing timing per a band, a plurality bridges 107/108 and a plurality of generic buses 100B/100C are alternately used. Accordingly, it becomes possible to improve the image processing speed without replacing the generic buses to high-speed generic buses.

In the configurations and the operations described above, when executing image formation for a plurality of pages, the configurations and the operations are arranged so that while printer engine 140 is executing image formation, if the image processing section 121 executes the image output processing, the image processing section 122 generates compressed bitmap image data in parallel.

Namely, the image processing section 122 which is not connected with the printer engine 140 generates bitmap image data and the image processing section 121 which is connected with the printer engine 140 transmits the compressed bitmap image data to the printer engine 140. Based on this arrangement, since each of a plurality of bridges 107/108 and a plurality of generic buses 100B/100C is used different purposes in parallel, it becomes possible to improve the image processing speed without replacing the generic bus to high-speed generic bus.

Accordingly, the first embodiment has resolved the problems associated with the prior art, which is the data transmission speed (bandwidth) of the PCI bridge and the PCI bus becomes a bottleneck and an obstacle of high-speed data transmission. As a result, the problems that the productivity of image formation (the number of output sheet of image formation per a unit time) is limited by the data transmission speed (bandwidth) of PCI bridge and this PCI bus also have been eliminated.

The Second Embodiment

Figure 7:
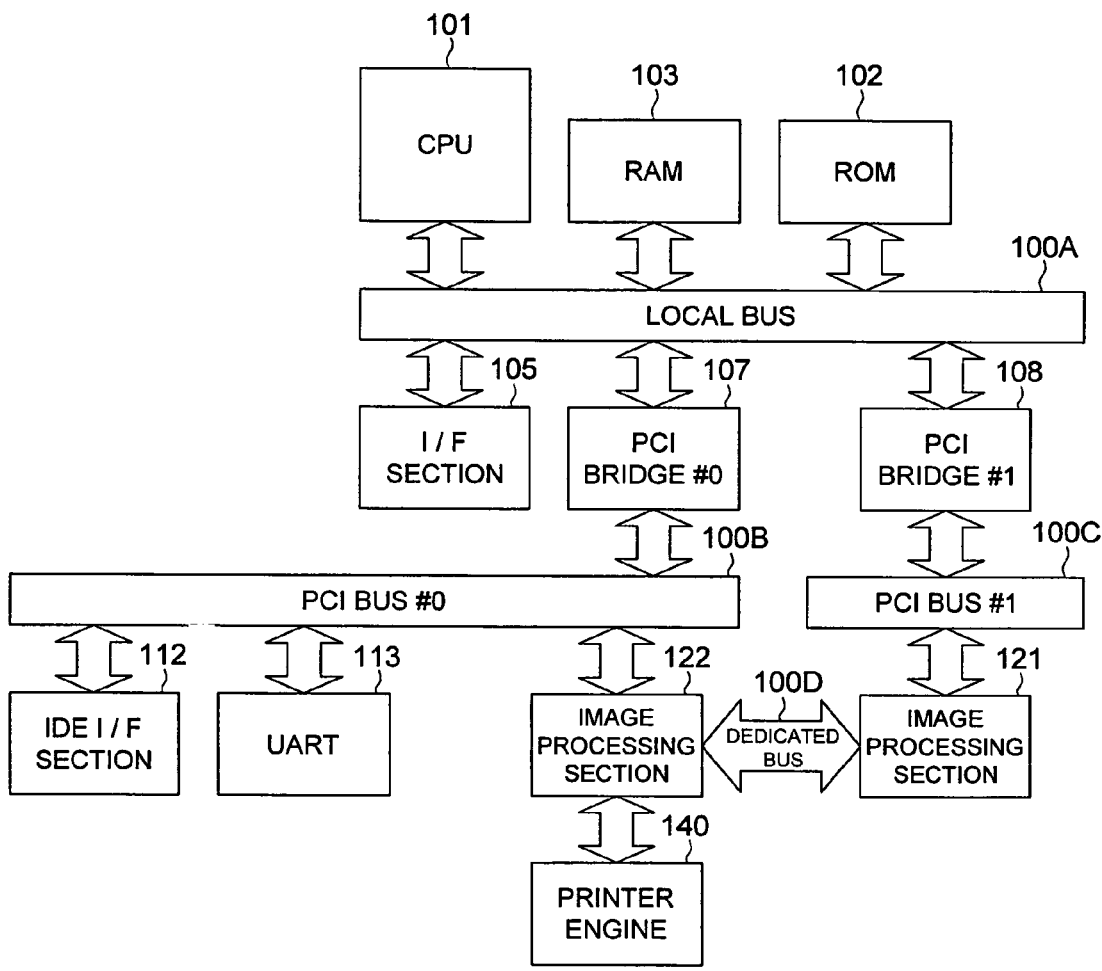
FIG. 7 illustrates a block diagram for showing the configuration of the image forming apparatus of the second embodiment of the present invention.

FIG. 7 illustrates a block diagram for showing the configuration of the image forming apparatus of the second embodiment of the present invention. In FIG. 7, duplicated descriptions will be eliminated by giving the same number to the same part used in the FIG. 1 in the first embodiment.

In the second embodiment illustrated in FIG. 7, the image processing section 121 as an image processing hardware #1 and the image processing section 122 as an image processing hardware #2 are connected each other through a dedicated bus 100D. The dedicated bus 100D is designed to have the same data transmission speed of PCI bus. In the second embodiment, the printer engine 140 is connected with the image processing section 122.

Namely, in the second embodiment, a plurality of independent generic buses 100B and 100C are independently connected with a plurality of image processing sections 121 and 122. The plurality of image processing sections 121 and 122 has functions for executing a predetermined image process and a predetermined compression process at least to the bitmap image data, and further generating compressed bitmap image data as processed image data. The image processing sections 121 and 122 need not always to have the same functions and may have the minimum functions for executing processes described later.

Here, image data flow and how the high-speed data transmission has been attained without bottleneck caused by the bandwidth of the PCI bus will be described in detail below by using flow charts illustrated in the block diagram of FIG. 8 and flowcharts illustrated in FIG. 9 onward indicating detail explanations of the block diagram illustrated in FIG. 7.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Figure 8:
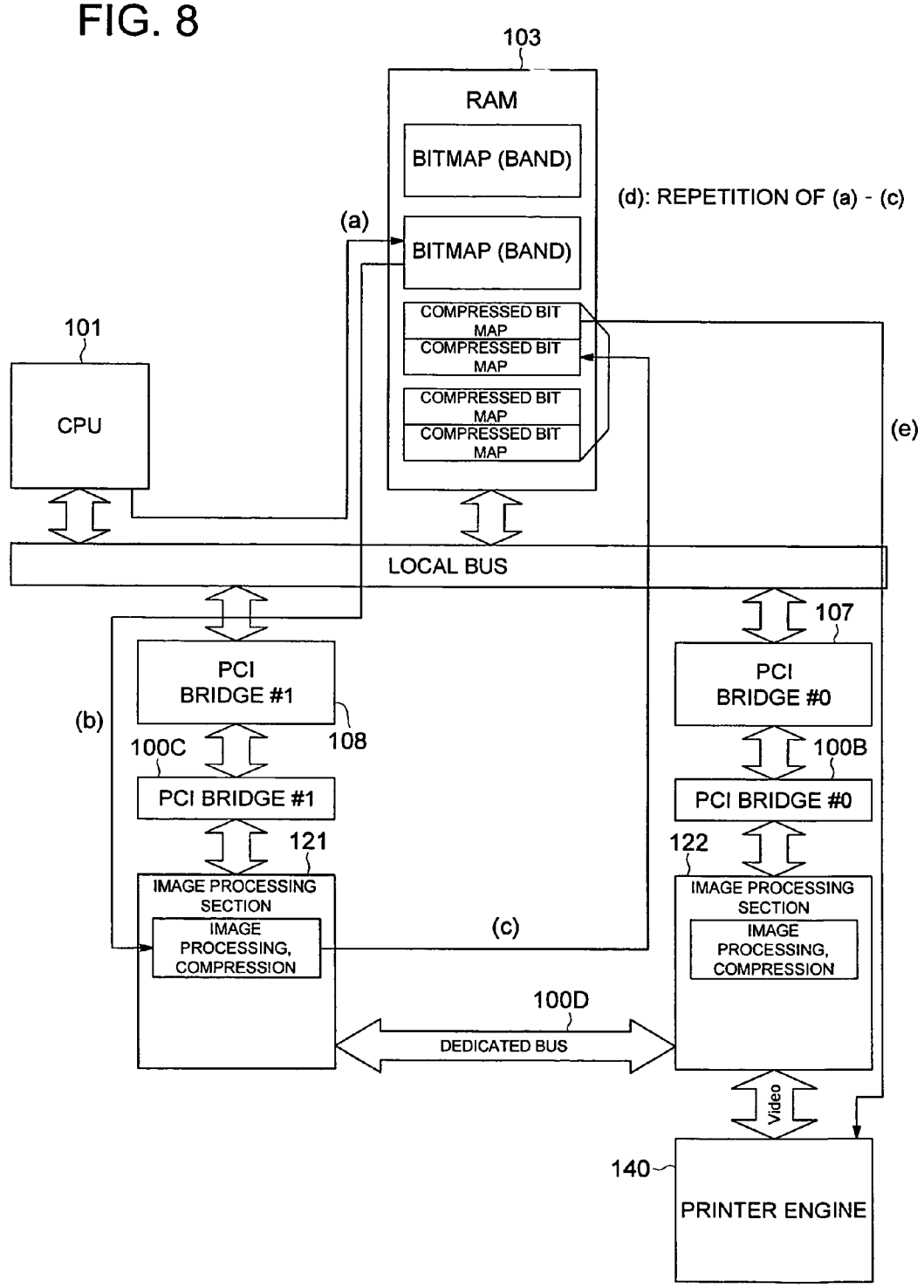
FIG. 8 illustrates a block diagram for showing the configuration and the operations of the image forming apparatus of the second embodiment of the present invention.
Figure 9:
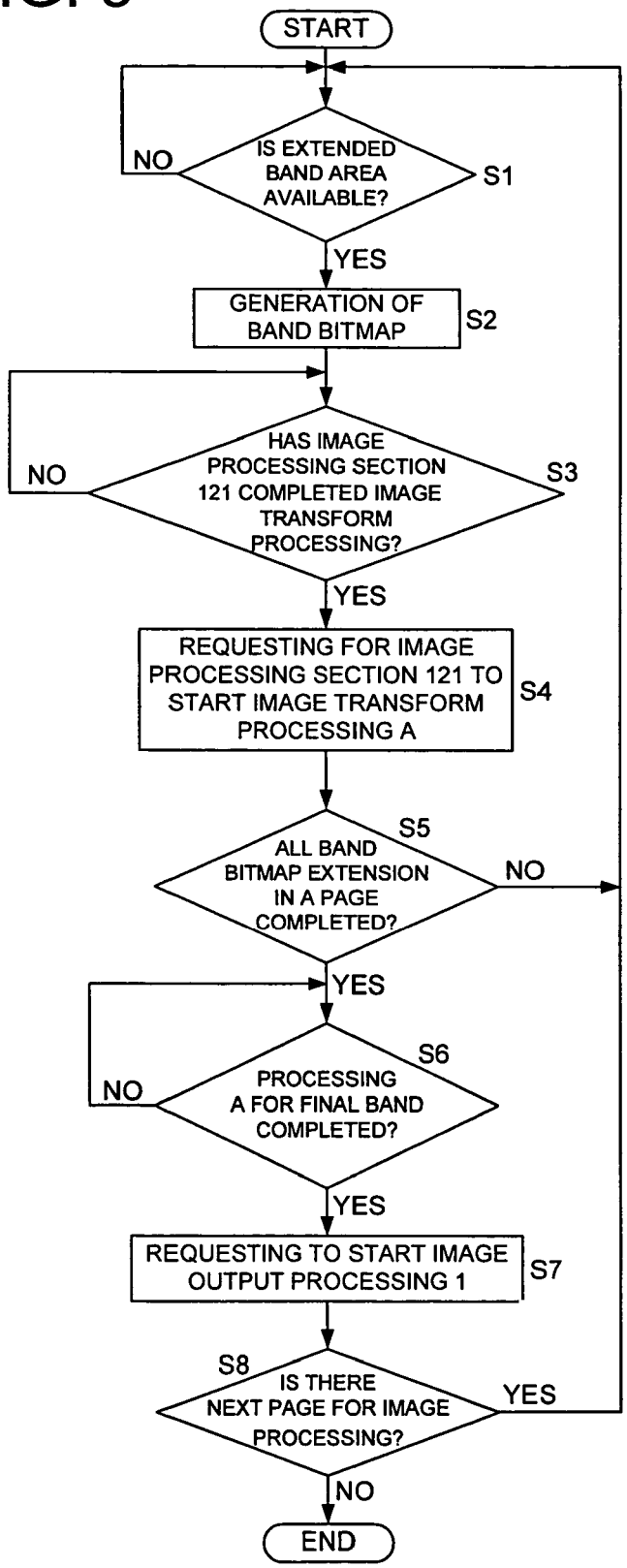
FIG. 9 illustrates a block diagram for showing the operations of the image forming apparatus of the second embodiment of the present invention.

Firstly, the CPU 101 checks whether the space area of an expanded band area in the RAM 103 for storing bitmap image data is available (Step 1: in FIG. 9). If the space area is available (Step S1: YES in FIG. 9), then the CPU 101 stores the bitmap image data divided into the band unit into the RAM 103 (Step S2 in FIG. 9 and (a) in FIG. 8).

The CPU 101 checks the operation status of the image processing section 121 (Step S3 in FIG. 9). The image processing section 121 has a function to execute an image transform processing A for compressing expanded bitmap image data and generating processed image data having a compressed bitmap format.

When the image processing section 121 is in the state that the image processing section 121 has completed the image transform processing A (image transform processing completion state) (Step S3: Yes in FIG. 9), the CPU 101 requests the image processing section 121 to start the image transform processing A (Step S4 in FIG. 9).

If the image processing section 121 is not in the state the image processing section 121 has completed the image transform processing A (an image transform processing completion state) (Step S3: NO in FIG. 9), the CPU 101 is in a standby mode until the image processing section 121 shifts into the state that the image processing section 121 has completed the image transform processing A (an image transform processing completion state).

Figure 10:
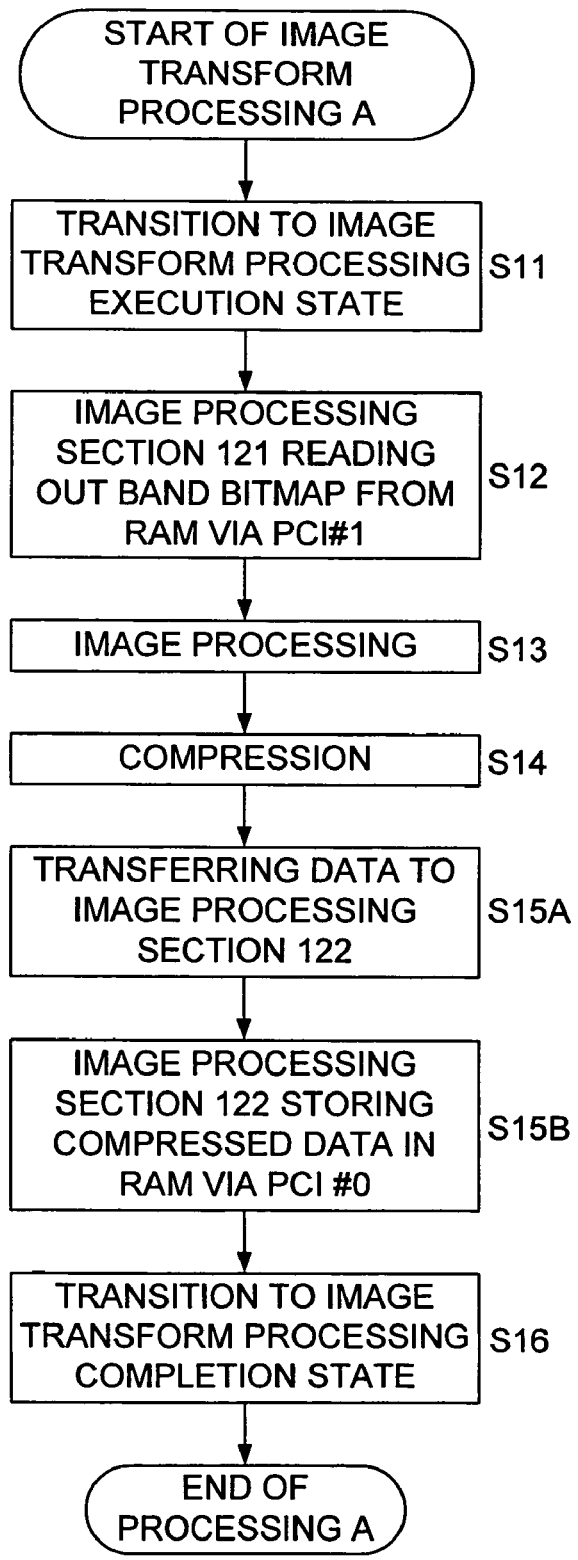
FIG. 10 illustrates a block diagram for showing the operations of the image forming apparatus of the second embodiment of the present invention.

Here, the image processing section 121 to which the image transform processing A has been requested, shifts into a state that the image transform processing is under execution (Step S11 in FIG. 10). Then, the image processing section 121 reads out the bitmap image data per a band from the RAM 103 (S12 in FIG. 10).

Namely, when the CPU 101 issues the request of the image transform processing A to the image processing section 121, the bitmap image data per a band are transmitted from the RAM 103 to the image processing section 121 in a DMA mode through the local bus 100A, the PCI bridge 108 and PCI bus. 100C ((b) in FIG. 8).

Then, the image processing section 121 applies a predetermined image processing (Step S13 in FIG. 10) and a compression processing (Step S14 in FIG. 10) on the bitmap image data per a band and generates compressed bitmap image data as processed image data.

Here, the image processing section 121 transmits the compressed bitmap image data generated from the bitmap image data per a band to the image processing section 122 through the dedicated bus 100D (Step S15A in FIG. 10). Then, the image processing section 122 which has received the compressed bitmap image data, stores the compressed bitmap image data into the area for the compressed bitmap image data in the RAM 103 (Step S15B in FIG. 10).

Namely, the image processing section 121 applies the image processing and the compression processing to the bitmap imaged data per a band, the compressed bitmap image data per a band are transmitted from the image processing section 121 to the RAM 103 in a PCIO mode through the PCI bus 100B, the PCI bridge and the local bus 100A ((c) in FIG. 8). Then the image processing section 121 shifts to an image transform completion state (Step S16 in FIG. 10).

After the DMA transmission (S12 in FIG. 10) described above is executed, the CPU 101 deletes the bitmap image data per a band in the RAM 103, which have been transmitted. Or, when the image processing section 121 reads out the bitmap image data per a band in the RAM 103, the CPU 101 deletes the bitmap image data per a band by way of executing a move command, not a copy command for the image data.

Further, the CPU 101 generates expanded bitmap image data of a plurality of bands corresponding to one page image data. The CPU 101 determines whether the CPU 101 has completed the generation of bitmap image data of all the bands in the one page (Step S5 in FIG. 9).

If the CPU 101 determines that the CPU 101 has not completed the generation of bitmap image data of all bands in one page (Step S5: NO in FIG. 9), the CPU 101 further checks the space area in the expanded band area for storing bitmap image data in the RAM 103 (Step S1 in FIG. 9). If the space area is available (Step S1: YES in FIG. 9), the CPU 101 stores the bitmap image data of a next band unit into the RAM 103 (Step S2 in FIG. 9 and (a) in FIG. 8).

Operation state check of the image processing section 121 by the CPU 101 (Step S3 in FIG. 9), a request for the image processing section 121 to start the image transform processing A by the CPU 101 (Step S4 in FIG. 9), an image transform processing in the image processing section 121 (Steps S11-S14 in FIG. 10) and compressed bitmap image data transmission from the image processing section 121 to the RAM 103 through the image processing section 122 are repeated per a band over the bitmap image data of all bands in a page.

When the CPU 101 completes the image transform processing per a band on all band bitmap image data in a page (Step S5 YES and Step S6: YES in FIG. 9), the CPU 101 issues a start-request of an image output processing 1 to the image processing section 122 to which the printer engine 140 is connected (Step S7 in FIG. 9).

Here, the image processing section 122 may have a function for transmitting at least compressed bitmap image data from the RAM 103 to the printer engine 140 other than a function for transmitting the compressed bitmap image data to the RAM 103.

Figure 11:
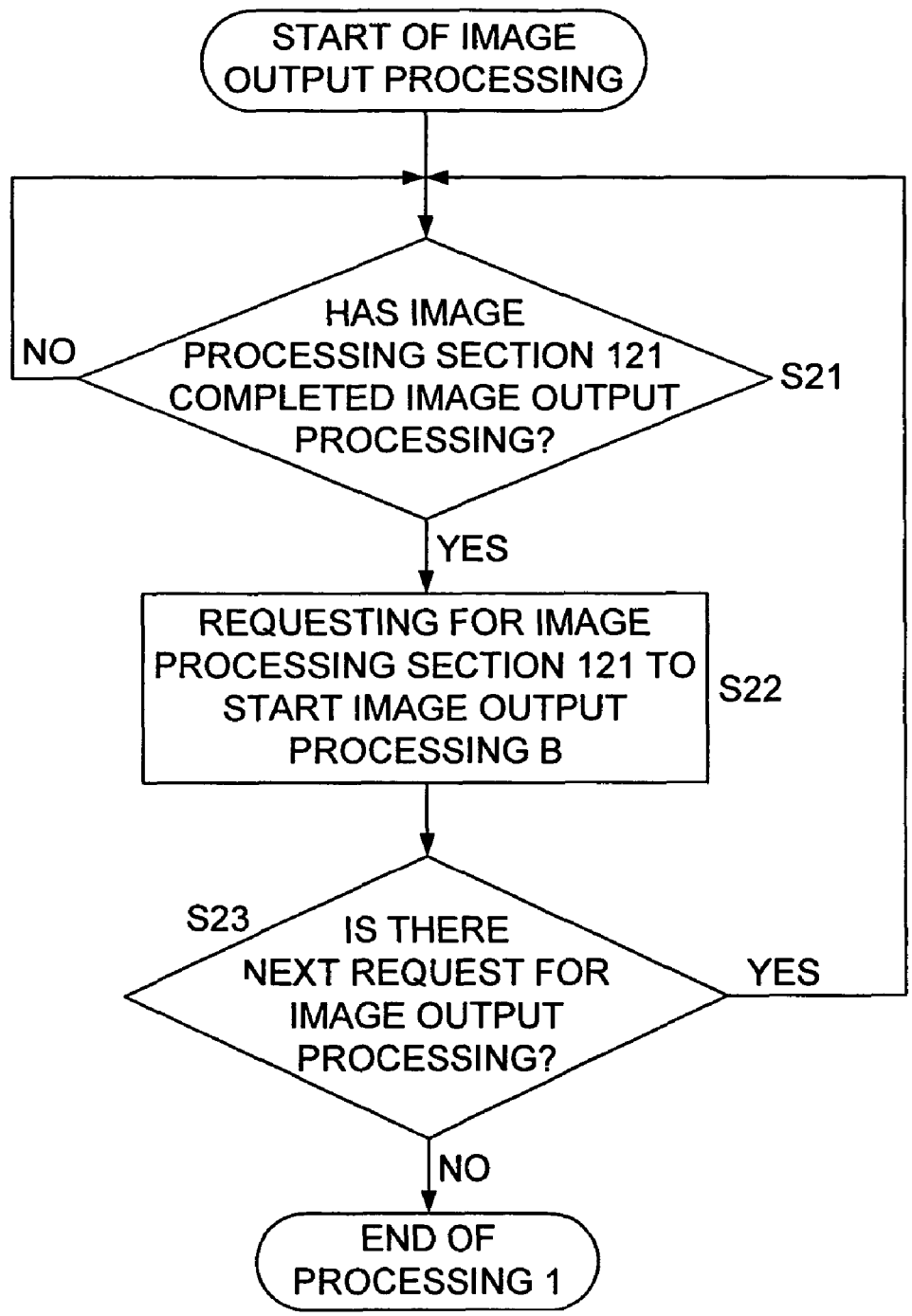
FIG. 11 illustrates a block diagram for showing the operations of the image forming apparatus of the second embodiment of the present invention.

Here, the CPU 101 checks the operation state of the image processing section 122 (Step S21 in FIG. 11). The CPU 101 enters into a standby mode if the image processing section 122 is not in a state where the image processing section 122 has completed image output processing (Step 21: NO in FIG. 11). If the image processing section 122 is in a state where the image processing section 121 has completed image output processing (Step 21: YES in FIG. 11), then the CPU 101 requests the image forming processing 122 to start an image output processing B (Step S21 in FIG. 11). The CPU 101 comes back to the step S1 to check the state of the image processing section 122 if there is a next request for image output processing (Step 23: YES in FIG. 11), and if there is no next request for image output processing (Step S23 in FIG. 11), then the CPU 101 completes the image output processing 1.

Figure 12:
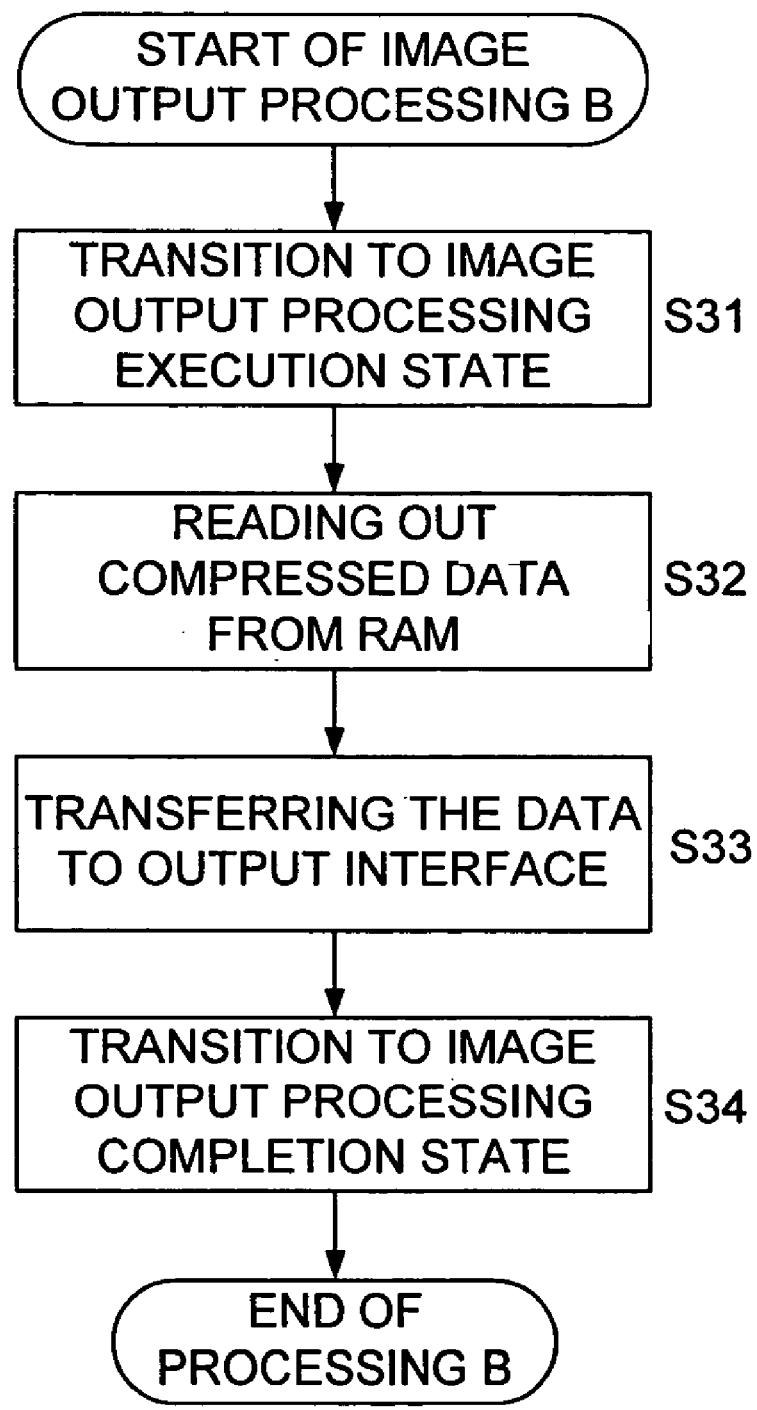
FIG. 12 illustrates a block diagram for showing the operations of the image forming apparatus of the second embodiment of the present invention.

The image processing section 122 shifts to an image output processing execution state (Step S31 in FIG. 12). And the image processing section 122 reads out compressed bitmap image data from the RAM 103 (Step S32 in FIG. 12).

Then, the image processing section 122 transmits the compressed bitmap image data from the video port to the printer engine 140 corresponding to the image formation of the printer engine 140 per a page and per a color (Step 33 in FIG. 12). And when the image processing section 122 completes the data transmission of the one page bitmap image data, the image processing section 122 shifts to an image output processing completion state (Step S34 in FIG. 12).

The CPU 101 checks whether there are next image data when completing the image formation of all one-page image data (Step S8 in FIG. 9). If there are next image data (Step S8: YES in FIG. 9), the CPU 101 repeats the processes in FIG. 9 from step 1. If there is no next image data (Step S8: NO in FIG. 9), the CPU 101 completes all processes and shifts to a completed state.

In the configurations and operations described above, the image processing sections 121 and 122 separately play roles for generating the compressed bitmap image data and storing the compressed bitmap image data to the RAM 103. As a result, since a plurality of image processing sections 121 and 122 conduct image processing and then storing image data to the RAM 163 while sharing the processing timing per a band, a plurality of bridges 107/108 and a plurality of generic buses 100B/100C are alternatively used. Accordingly, it becomes possible to improve the image processing speed without replacing the generic bus to high performance generic bus.

Further, in the configurations and the operations described above, when executing an image formation of plural pages, if the image processing section 122 is executing image output processing while the printer engine 140 is under execution of the image formation, the image processing section 121 is arranged to play roles for reading out bitmap image data per a band and for generating compressed bitmap image data.

Namely, the image processing section 121 to which the printer engine 140 is not connected reads out the bitmap image data per a band from the RAM 103 and generates the compressed bitmap image data. The image processing section 122 to which the printer engine 140 is connected stores the compressed bitmap image data into the RAM 103 and simultaneously transmits the compressed bitmap image data to the printer engine 140. Based on this arrangement, since each of a plurality of bridges 107/108 and a plurality of generic buses 100B/100C is used different purposes in parallel, it becomes possible to improve the image processing speed without replacing the generic bus to high-speed generic bus.

Accordingly, the second embodiment has resolved the problems associated with the prior art, which is the data transmission speed (bandwidth) of the PCI bridge and the PCI bus becomes a bottleneck and an obstacle of high-speed data transmission. As a result, the problems that the productivity of image formation (the number of output sheet of image formation per a unit time) is limited by the data transmission speed (bandwidth) of PCI bridge and this PCI bus also have been eliminated.

The Third Embodiment

Figure 13:
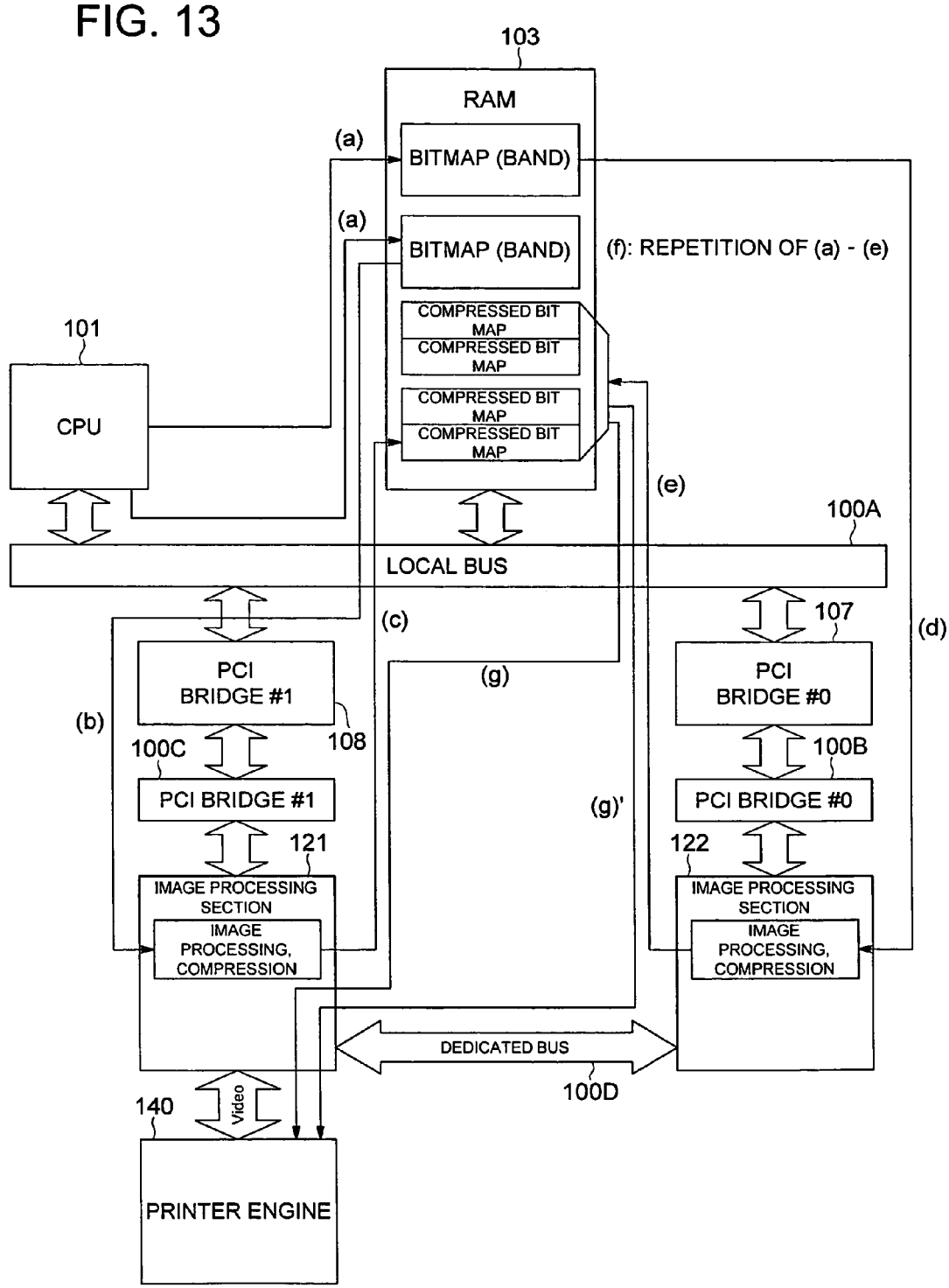
FIG. 13 illustrates a block diagram for showing the configuration and the operations of the image forming apparatus of the third embodiment of the present invention.

FIG. 13 illustrates a block diagram for showing the configuration of the image forming apparatus of the third embodiment of the present invention. In FIG. 13 duplicated descriptions will be eliminated by allotting the same number to the same part used in the FIG. 1 in the first embodiment.

In the third embodiment illustrated in FIG. 13, the image processing section 121 as an image processing hardware #1 and the image processing section 122 as an image processing hardware #2 are connected each other through a dedicated bus 100D. The dedicated bus 100D is designed to have the same data transmission speed as PCI bus. In the third embodiment, the printer engine 140 is connected with the image processing section 121.

Namely, in the third embodiment, a plurality of independent generic buses 100B and 100C are independently connected with a plurality of image processing sections 121 and 122. The plurality of image processing sections 121 and 122 has functions for executing a predetermined image process and a predetermined compression process at least to the bitmap image data, and further generating compressed bitmap image data as processed image data. The image processing sections 121 and 122 need not always to have the same functions and may have the minimum functions for executing processes described later.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Firstly, the CPU 101 checks whether the space area of an expanded band area in the RAM 103 for storing bitmap image data is available. If space area is available, then the CPU 101 stores the bitmap image data divided into the band unit into the RAM 103 ((a) in FIG. 13).

Then, the CPU 101 checks the operation state of the image processing section 121. The image processing section 120 has functions to execute an image transform processing A for generating processed image data having a compressed bitmap format by compressing image data having an expanded bitmap format and to execute an image transformation processing B for generating output image data from the processed image data. When the image processing section 121 is in the state that the image processing section 121 has completed the image transform processing A (image transform processing completion state), the CPU 101 requests the image processing section 121 to start the image transform processing A.

The CPU 101 checks the operation state of the image processing section 122 if the image processing section 121 is in a state that the image processing section 121 has completed the image transform processing A (an image transform processing completion state). The image processing section 122 has functions to execute an image transform processing A for generating processed image data having a compressed bitmap format by compressing image data having an expanded bitmap format and to execute an image transformation processing B for generating output image data from the processed image data. If the image processing section 122 is in a state that the image processing section 122 has completed the image transform processing A (an image transform processing completion state), the CPU 101 requests the image processing section 122 to start the image transform processing A.

Here, either the image processing section 121 or 122 shifts to a state that either the image processing section 121 or 122 is under image transforms processing. And either the image processing section 121 or 122 reads out the bitmap image data per a band from the RAM 103.

Namely, when the CPU 101 issues the request of the image transform processing A to the image processing section 121, the bitmap image data per a band are transmitted from the RAM 103 to the image processing section 121 in a DMA mode through the local bus 100A, the PCI bridge 108 and PCI bus 100C ((b) in FIG. 13).

When the CPU 101 issues the request of the image processing A to the image processing section 122, bitmap image data per a band are transmitted from RAM 103 to the image processing section 122 in a DMA mode through the local bus 100A, the PCI bridge 107 and the PCI bus 100B ((d) in FIG. 13).

Either the image processing section 121 or 122 applies a predetermined image processing and a predetermined compression processing to bitmap image data per a band and generates compressed bitmap image data as compressed image data. Either the image processing section 121 or 122 stores the compressed bitmap image data generated from the bitmap image data per a band into the area for compressed bitmap image data in the RAM 103.

Namely, when the image processing section 121 executes the image processing and the compression processing, compressed bitmap image data per a band are transmitted from the image processing section 121 to the RAM 103 in a DMA mode through the PCI bus 100C, the PCI bridge 108 and the local bus 100A ((c) in FIG. 13). Then, the image processing section 121 shifts to an image transform processing completion state.

When the image processing section 122 executes the image processing and the compression processing, compressed bitmap image data per a band are transmitted from the image processing section 122 to the RAM 103 in a DMA mode through the PCI bus 100B, the PCI bridge 107 and the local bus 100A ((e) in FIG. 13). Then, the image processing section 122 shifts to an image transform processing completion state.

After the DMA transmission described above is executed, the CPU 101 deletes the bitmap image data per a band in the RAM 103, which has been transmitted. Otherwise, when the image processing section 121 or 122 reads out the bitmap image data per a band, the CPU 101 deletes the bitmap image data per a band which have been transmitted, by way of a move command, not a copy command.

Further, the CPU 101 generates expanded bitmap image data of a plurality of bands corresponding to one page image data. The CPU 101 determines that whether the CPU 101 has completed the generation of bitmap image data of all the bands in the one page. If all bitmap image data per a band in one page have not been generated, the CPU 101 checks whether the space area for storing bitmap image data is available in the RAM 103. When the space area is available, the CPU 101 stores the next bitmap image data per a band into the RAM 103 ((a) in FIG. 13).

Operation state check of the image processing section 121 or 122 by the CPU 101, a request for the image processing section 121 or 122 to start the image transform processing A by the CPU 101, an image transform processing by the image processing section 121 or 122 and compress bitmap image data transmission form the image processing section 121 or 122 to the RAM 103 are repeated per a band over the bitmap image data of all bands in a page.

In the third embodiment, since when either the image processing section 121 or 122 is in an image processing state, the other image processing section which has completed the image transformation is selected to start the image processing, it becomes possible that a plurality of image processing sections can alternately execute image processing while sharing a processing timing per a band.

When the CPU 101 completes the image transform processing per a band on all band bitmap image data in a page, the CPU 101 issues a start-request of an image output processing 1 both to the image processing section 121 to which the printer engine 140 is connected and the image processing section 122 to which the printer engine 140 is not connected.

Here, the CPU 101 checks the opertion states of the image processing sections 121 and 122. Then, the CPU 101 requests either the image processing section 121 or 122 to execute the image output processing B if either of the image processing section 121 or 122 is in a state that the either of the image processing section 121 or 122 is in the image output processing completion state. The CPU 101 checks the operation states of the image processing sections 121 and 122 if there is a request for the next image output processing. If there is no request for the next image output processing, the CPU 101 completes the image output processing 1.

Here, either the image processing section 121 or 122, which receives a request for starting image output processing B from the CPU 101 shifts to an image output processing execution state. Either image processing section 121 or 122 reads out compressed bitmap image data from the RAM 103.

Then, either the image processing section 121 or 122 transmits the compressed bitmap image data to the printer engine 140 from a video board per a page and a color corresponding to the image formation of the printer engine 140. If the image processing section 122 completes the transmission of the one page compressed bitmap image data, the image processing section 122 shifts to an image output processing completion state.

The CPU 101 checks whether there is next image data when completing the image formation of all one-page image data. If there is next image data, the CPU 101 repeats the processes. If there is no next image data, the CPU 101 completes all processes and shifts to a completed state.

In the third embodiment, since the image processing sections 121 and 122 are connected trough a dedicated bus 100D, if either the image processing section 121 or 122 is under an image output processing execution state, the other image processing section, which has completed image output processing is selected and arranged to start image output processing. Accordingly, the image processing sections 121 and 122 alternatively execute image output processing while sharing a processing timing ((g) and (g') in FIG. 13).

Namely, if the image processing section 121, with which the printer engine 140 is connected, is under processing of a certain task, it is possible that the image processing section 122, with which no printer engine 140 is connected, executes image output processing and transmits the output image data to the printer engine 140 through the dedicated bus 100D.

In the configurations and the operations described above, the image processing sections 121 and 122 alternatively execute image transform processing and image output processing in parallel. As a result, since a plurality of image processing sections 121 and 122 executes image processing while sharing a processing timing per a band, and a processing timing of the image transform processing and the image output processing, a plurality of bridges 107/108 and a plurality of generic buses 100B/100C are alternatively used. Consequently, it becomes possible to improve image processing speed without replacing the generic bus to high performance generic bus.

Further, in the configurations and the operations described above, when executing an image formation of plural pages, if the image processing section 122 is executing image output processing while the printer engine 140 is under execution of the image formation, the image processing section 121 is arranged to play roles for reading out bitmap image data per a band and for generating compressed bitmap image data. Further, in the configurations and the operations described above, when executing an image formation of plural pages, if the image processing section 121 is executing image output processing while the printer engine 140 is under execution of the image formation, the image processing section 122 is arranged to play roles for reading out bitmap image data per a band and for generating compressed bitmap image data.

Namely, it becomes possible for the image processing sections 121 and 122, not only to share a processing timing of image transform processing but also an image output processing by connecting the image processing sections 121 and 122 through a dedicated bus 100D. It also becomes possible to share a processing timing between image transform processing and image output processing.

Since a plurality of bridges 107/108 and a plurality of generic buses 100B/100C are separately used for different purposes in parallel in the image transform processing and the image output processing, it becomes possible to improve the image processing speed without replacing the generic bus to high performance generic bus.

Accordingly, the third embodiment has resolved the problems associated with the prior art, which is the data transmission speed (bandwidth) of the PCI bridge and the PCI bus becomes a bottleneck and an obstacle of high-speed data transmission. As a result, the problems that the productivity of image formation (the number of output sheet of image formation per a unit time) is limited by the data transmission speed (bandwidth) of PCI bridge and this PCI bus also have been eliminated.

The Fourth Embodiment

Figure 14:
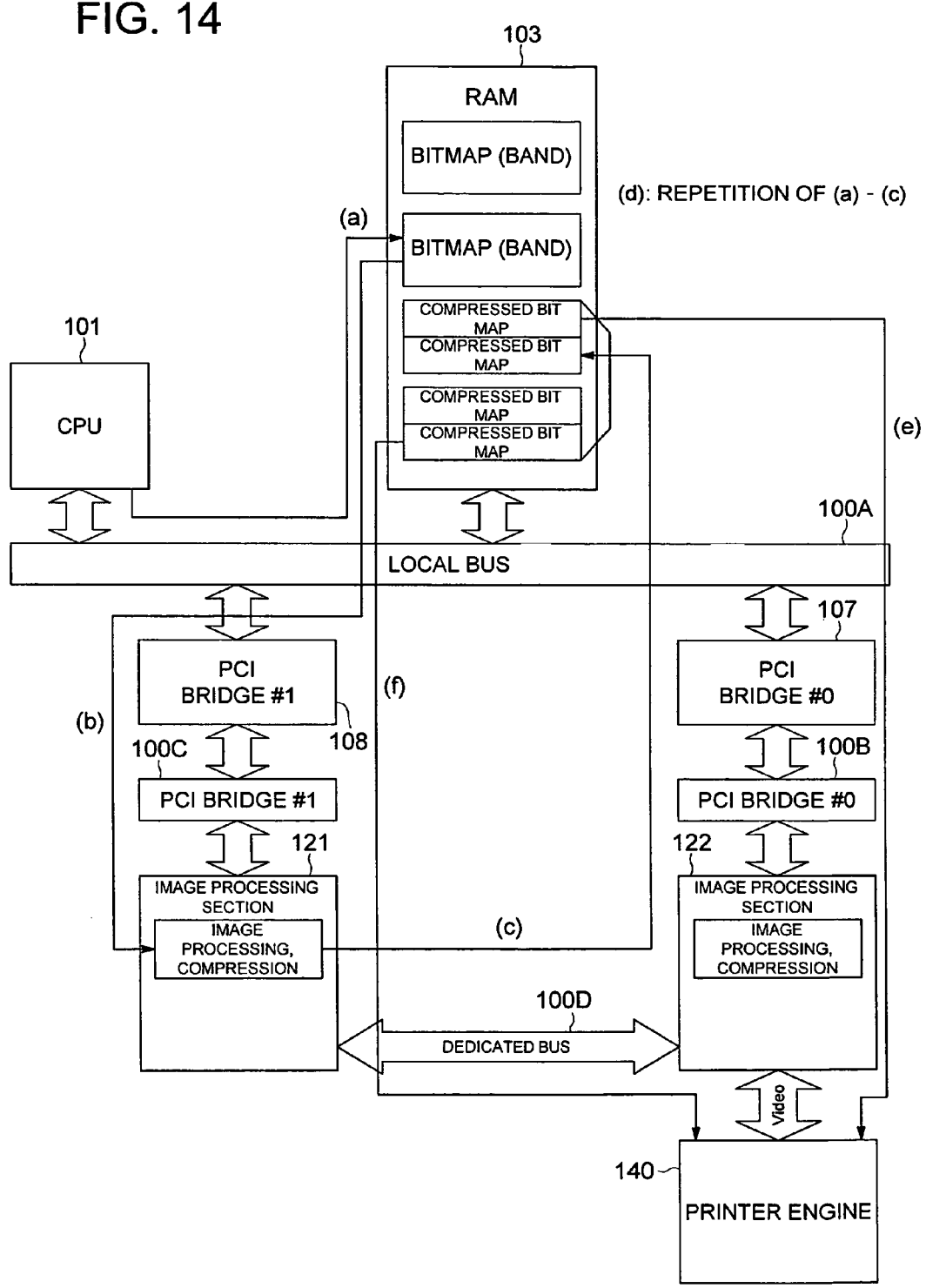
FIG. 14 illustrates a block diagram for showing the configuration and the operations of the image forming apparatus of the fourth embodiment of the present invention.

FIG. 14 illustrates a block diagram for showing the configuration of the image forming apparatus of the fourth embodiment of the present invention. In FIG. 14 duplicated descriptions will be eliminated by giving the same number to the same part used in the FIG. 1 in the first embodiment.

In the forth embodiment illustrated in FIG. 14, the image processing section 121 as an image processing hardware #1 and the image processing section 122 as an image processing hardware #2 are connected each other through a dedicated bus 100D. The dedicated bus 100D is designed to have the same data transmission speed as PCI bus. In the forth embodiment, the printer engine 140 is connected with the image processing section 121.

Namely, in the forth embodiment, a plurality of independent generic buses 100B and 100C are independently connected with a plurality of image processing sections 121 and 122. The plurality of image processing sections 121 and 122 has functions for executing a predetermined image process and a predetermined compression process at least to the bitmap image data, and further generating compressed bitmap image data as processed image data. The image processing sections 121 and 122 need not always to have the same functions and may have the minimum functions for executing processes described later.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Firstly, the CPU 101 checks whether the space area of an expanded band area in the RAM 103 for storing bitmap image data is available. If space area is available, then the CPU 101 stores the bitmap image data divided into the band unit into the RAM 103 ((a) in FIG. 14).

The CPU 101 checks the operation status of the image processing section 121. The image processing section 121 has a function to execute an image transform processing A for compressing expanded bitmap image data and generating processed image data having a compressed bitmap format.

If the image processing section 121 is in a state that the image processing section 121 has completed the image transform processing A (an image transform processing completion state), the CPU 101 requests the image processing section 121 to start the image transform processing A. If the image processing section 121 is not in a state that the image processing section 121 has completed the image transform processing A (an image transform processing completion state), the CPU 101 waits until the image processing section 121 shifts into a state that the image processing section 121 has completed the image transform processing A (an image transform processing completion state).

Here, the image processing section 121 to which the image transform processing A has been requested shifts into a state that the image transform processing is under execution. Then, the image processing section 121 reads out the bitmap image data per a band from the RAM 103.

Namely, when the CPU 101 issues the request of the image transform processing A to the image processing section 121, the bitmap image data per a band are transmitted from the RAM 103 to the image processing section 121 in a DMA mode through the local bus 100A, the PCI bridge 108 and PCI bus 100C ((b) in FIG. 14).

Then, the image processing section 121 applies a predetermined image processing and a compression processing on the bitmap image data per a band and generates compressed bitmap image data as processed image data.

Here, the image processing section 121 transmits the compressed bitmap image data generated from the bitmap image data per a band to the image processing section 122 through the dedicated bus 100D. Then, the image processing section 122, which has received the compressed bitmap image data, stores the compressed bitmap image data into the area for the compressed bitmap image data in the RAM 103.

Namely, the image processing section 121 applies the image processing and the compression processing to the bitmap imaged data per a band, the compressed bitmap image data per a band are transmitted from the image processing section 121 to the RAM 103 in a PCIO mode through the PCI bus 100B, the PCI bridge and the local bus 100A ((c) in FIG. 14). Then the image processing section 121 shifts to an image transform completion state.

After the DMA transmission described above is executed, the CPU 101 deletes the bitmap image data per a band in the RAM 103, which have been transmitted. Or, when the image processing section 121 reads out the bitmap image data per a band in the RAM 103, the CPU 101 deletes the bitmap image data per a band by way of executing a move command, not a copy command for the image data.

Further, the CPU 101 generates expanded bitmap image data of a plurality of bands corresponding to one page image data. The CPU 101 determines that whether the CPU 101 has completed the generation of bitmap image data of all the bands in the one page.

If all bitmap image data per a band in one page have not been generated, the CPU 101 checks whether the space area for storing bitmap image data is available in the RAM 103. When the space area is available, the CPU 101 stores the next bitmap image data per a band into the RAM 103 ((a) in FIG. 14).

Operation state check of the image processing section 121 by the CPU 101a, request for the image processing section 121 to start the image transform processing A by the CPU 101, an image transform processing by the image processing section 122 and compressed bitmap image data transmission from the image processing section 121 to the RAM 103 through the image processing section 122 are repeated per a band over the bitmap image data of all bands in a page.

In the configurations and operations described above, the image processing sections 121 and 122 separately play roles for generating the compressed bitmap image data and storing the compressed bitmap image data to the RAM 103. As a result, since a plurality of image processing sections 121 and 122 conduct image processing and then storing image data to the RAM 103 while sharing the processing timing per a band, a plurality of bridges 107/108 and a plurality of generic buses 100B/100C are alternatively used. Accordingly, it becomes possible to improve the image processing speed without replacing the generic bus to high performance generic bus.

When the CPU 101 completes the image transform processing per a band on all band bitmap image data in a page, the CPU 101 issues a start-request of an image output processing 1 both to the image processing section 121 to which the printer engine 140 is connected and the image processing section 122 to which the printer engine 140 is not connected.

Here, the CPU 101 checks the operation states of the image processing sections 121 and 122. Then, the CPU 101 requests either the image processing section 121 or 122 to execute the image output processing B if either of the image processing section 121 or 122 is in a state that the either of the image processing section 121 or 122 is in the image output processing completion state. The CPU 101 checks the operation states of the image processing sections 121 and 122 if there is a request for the next image output processing. If there is no request for the next image output processing, the CPU 101 completes the image output processing 1.

Here, either the image processing section 121 or 122, which receives a request for starting image output processing B from the CPU 101 shifts to an image output processing execution state. Either image processing section 121 or 122 reads out compressed bitmap image data from the RAM 103.

Then, either the image processing section 121 or 122 transmits the compressed bitmap image data to the printer engine 140 from a video board per a page and a color corresponding to the image formation of the printer engine 140. If the image processing section 122 completes the transmission of the one page compressed bitmap image data, the image processing section 122 shifts to an image output processing completion state.

The CPU 101 checks whether there is next image data when completing the image formation of all one-page image data. If there is next image data, the CPU 101 repeats the processes. If there is no next image data, the CPU 101 completes all processes and shifts to a completed state.

In the fourth embodiment, since the image processing sections 121 and 122 are connected trough a dedicated bus 100D, if either the image processing section 121 or 122 is under an image output processing execution state, the other image processing section, which has completed image output processing is selected and arranged to start image output processing. Accordingly, the image processing sections 121 and 122 alternatively execute image output processing while sharing a processing timing ((e) and (f) in FIG. 14).

Namely, if the image processing section 121, with which the printer engine 140 is connected, is under processing of a certain task, it is possible that the image processing section 122, with which no printer engine 140 is connected, executes image output processing and transmits the output image data to the printer engine 140 through the dedicated bus 100D.

In the configurations and the operations described above, the image processing sections 121 and 122 alternatively execute image transform processing, image data transmission to the RAM 103 after the image transform processing and image output processing in parallel. As a result, since a plurality of image processing sections 121 and 122 execute image processing while sharing a processing timing per a band, and sharing a processing timing of the image transform processing and the image output processing, a plurality of bridges 107/108 and a plurality of generic buses 100B/100C are alternatively used. Consequently, it becomes possible to improve image processing speed without replacing the generic bus to high performance generic bus.

Since the image processing sections 121 and 122 are connected through the dedicated bus 100D, it becomes possible not only to share timings of an image transform processing and image data transmitting but also to share the image output processing. It also becomes possible to share a processing timing of the image transform processing and the image output processing.

Since a plurality of bridges 107/108 and a plurality of generic buses 100B/100C are separately used for different purposes in parallel in the image transform processing and the image output processing, it becomes possible to improve the image processing speed without replacing the generic bus to high performance generic bus.

Accordingly, the fourth embodiment has resolved the problems associated with the prior art, which is the data transmission speed (bandwidth) of the PCI bridge and the PCI bus becomes a bottleneck and an obstacle of high-speed data transmission. As a result, the problems that the productivity of image formation (the number of output sheet of image formation per a unit time) is limited by the data transmission speed (bandwidth) of PCI bridge and this PCI bus also have been eliminated.

The Fifth Embodiment

Figure 15:
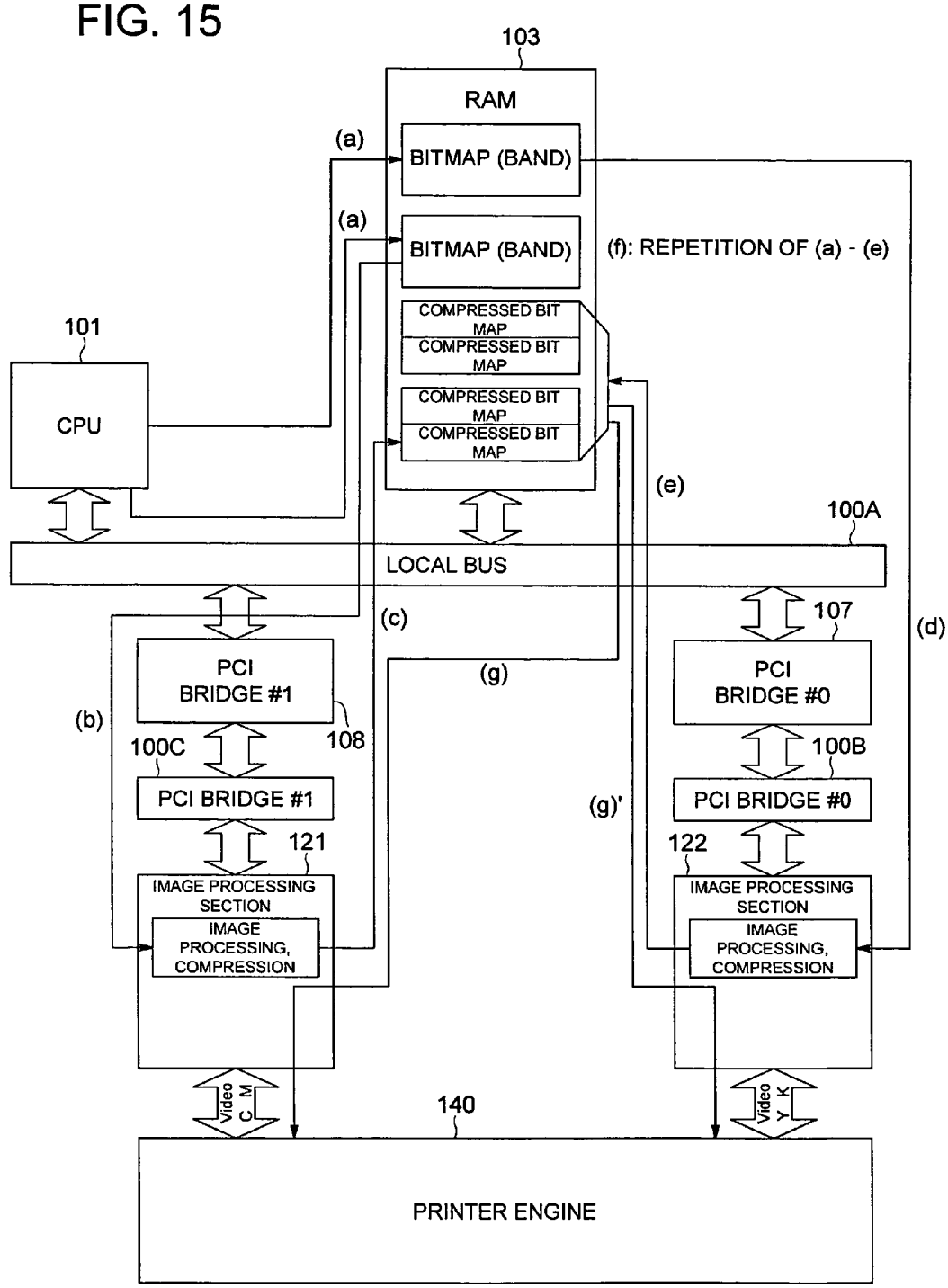
FIG. 15 illustrates a block diagram for showing the configuration and the operations of the image forming apparatus of the fifth embodiment of the present invention.

FIG. 15 illustrates a block diagram for showing the configuration of the image forming apparatus of the fifth embodiment of the present invention. In FIG. 15 duplicated descriptions will be eliminated by giving the same number to the same part used in the FIG. 1 in the first embodiment.

In the fifth embodiment illustrated in FIG. 15, the image processing section 121 as an image processing hardware #1 and the image processing section 122 as an image processing hardware #2 are separately connected with input ports of the printer engine 140 through video ports. In this case, the printer engine 140 may include two input ports.

Namely, in the fifth embodiment, a plurality of independent generic buses 100B and 100C are independently connected with a plurality of image processing sections 121 and 122. The plurality of image processing sections 121 and 122 has functions for executing a predetermined image process and a predetermined compression process at least to the bitmap image data, and further generating compressed bitmap image data as processed image data. The image processing sections 121 and 122 need not always to have the same functions and may have the minimum functions for executing processes described later.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Firstly, the CPU 101 checks whether the space area of an expanded band area in the RAM 103 for storing bitmap image data is available. If space area is available, then the CPU 101 stores the bitmap image data divided into the band unit into the RAM 103 ((*a*) in FIG. 15).

Then, the CPU 101 checks the operation state of the image processing section 121. The image processing section 120 comprises functions for executing an image transform processing A for generating processed image data having a compressed bitmap format by compressing image data having an expanded bitmap format and for executing an image transformation processing B for generating output image data from the processed image data. When the image processing section 121 is in the state that the image processing section 121 has completed the image transform processing A (image transform processing completion state), the CPU 101 requests the image processing section 121 to start the image transform processing A.

If the image processing section 121 is not in the state that the image processing section 121 has completed the image transform processing A (image transform processing completion state), the CPU 101 checks the operation state of image processing section 122. The image processing section 122 has a function for executing an image transform processing A for compressing the expanded bitmap image data to generate processed image data having a compressed bitmap format and a function for executing an image output processing B for generating output image data from the processed image data having compressed bitmap format. If the image processing section 122 is in a state in the state the image processing section 122 has completed the image transform processing A (image transform processing completion state), then the CPU 101 requests image processing section 122 to start the image transform processing A.

Here, either the image processing section 121 or 122 shifts to a state that either the image processing section 121 or 122 is under image transforms processing. And either the image processing section 121 or 122 reads out the bitmap image data per a band from the RAM 103.

Namely, when the CPU 101 issues the request of the image transform processing A to the image processing section 121, the bitmap image data per a band are transmitted from the RAM 103 to the image processing section 121 in a DMA mode through the local bus 100A, the PCI bridge 108 and PCI bus 100C ((b) in FIG. 15).

When the CPU 101 issues the request of the image processing A to the image processing section 122, bitmap image data per a band are transmitted from RAM 103 to the image processing section 122 in a DMA mode through the local bus 100A, the PCI bridge 107 and the PCI bus 100B ((d) in FIG. 15).

Either the image processing section 121 or 122 applies a predetermined image processing and a predetermined compression processing to bitmap image data per a band and generates compressed bitmap image data as compressed image data. Either the image processing section 121 or 122 stores the compressed bitmap image data generated from the bitmap image data per a band into the area for compressed bitmap image data in the RAM 103.

Namely, when the image processing section 121 executes the image processing and the compression processing, compressed bitmap image data per a band are transmitted from the image processing section 121 to the RAM 103 in a DMA mode through the PCI bus 100C, the PCI bridge 108 and the local bus 100A ((c) in FIG. 15). Then, the image processing section 121 shifts to an image transform processing completion state.

When the image processing section 122 executes the image processing and the compression processing, compressed bitmap image data per a band are transmitted from the image processing section 122 to the RAM 103 in a DMA mode through the PCI bus 100B, the PCI bridge 107 and the local bus 100A ((e) in FIG. 15). Then, the image processing section 122 shifts to an image transform processing completion state.

After the DMA transmission described above is executed, the CPU 101 deletes the bitmap image data per a band in the RAM 103, which has been transmitted. Otherwise, when the image processing section 121 or 122 reads out the bitmap image data per a band, the CPU 101 deletes the bitmap image data per a band which have been transmitted, by way of a move command, not a copy command.

Further, the CPU 101 generates expanded bitmap image data of a plurality of bands corresponding to one page image data. The CPU 101 determines that whether the CPU 101 has completed the generation of bitmap image data of all the bands in the one page. If all bitmap image data per a band in one page have not been generated, the CPU 101 checks whether the space area for storing bitmap image data is available in the RAM 103. When the space area is available, the CPU 101 stores the next bitmap image data per a band into the RAM 103 ((*a*) in FIG. 15).

Operation state check of the image processing section 121 or 122 by the CPU 101, a request for the image processing section 121 or 122 to start the image transform processing A by the CPU 101, an image transform processing by the image processing section 121 or 122 and compress bitmap image data transmission from the image processing section 121 or 122 to the RAM 103 are repeated per a band over the bitmap image data of all bands in a page.

In the fifth embodiment, since when either the image processing section 121 or 122 is in an image processing state, the other image processing section which has completed the image transformation is selected to start the image processing, it becomes possible that a plurality of image processing sections can alternately execute image processing while sharing a processing timing per a band.

When the CPU 101 completes the image transform processing per a band on all band bitmap image data in a page, the CPU 101 issues a start-request of an image output processing 1 to the both image processing sections 121 and 122 according to the image formation color of the printer engine 140.

Here, the CPU 101 requests the image processing section 121 to start image output processing B if the image formation color of the printer engine 140 is C (Cyan) or M (Magenta). If the image formation color of the printer engine 140 is Y (Yellow) or K (Black), the CPU 101 requests the image forming section 122 to start image output processing B.

The image processing section 121, which has received the image output processing B from the CPU 101 shifts to an image output processing execution state and reads out compressed bitmap image data of C or M from the RAM 103. The image processing section 122, which has received the image output processing B from the CPU 101 shifts to an image output processing execution state and reads out compressed bitmap image data of Y or K from the RAM 103.

Namely, either the image processing section 121 or 122 transmits compressed bitmap image data through a video port to the printer engine 140 corresponding to the image formation color order per a color and per a page.

The CPU 101 checks whether there is next image data when completing the image formation of all one-page image data. If there is next image data, the CPU 101 repeats the processes. If there is no next image data, the CPU 101 completes all processes and shifts to a completed state.

In the fifth embodiment, since, the image processing sections 121 and 122 are independently connected with the printer engine 140 through video ports thereof, the image processing sections 121 and 122 alternatively execute image output processing while sharing a processing timing ((g) and (g') in FIG. 15).

In the configurations and the operations described above, the image processing sections 121 and 122 alternatively execute image transform processing and image output processing in parallel. As a result, since a plurality of image processing sections 121 and 122 executes image processing while sharing a processing timing per a band, and a processing timing of the image transform processing and the image output processing, a plurality of bridges 107/108 and a plurality of generic buses 100B/100C are alternatively used. Consequently, it becomes possible to improve image processing speed without replacing the generic bus to high performance generic bus.

Further, in the configurations and the operations described above, when executing an image formation of plural pages, if the image processing section 122 is executing image output processing while the printer engine 140 is under execution of the image formation, the image processing section 121 is arranged to play roles for reading out bitmap image data per a band and for generating compressed bitmap image data. Further, in the configurations and the operations described above, when executing an image formation of plural pages, if the image processing section 121 is executing image output processing while the printer engine 140 is under execution of the image formation, the image processing section 122 is arranged to play roles for reading out bitmap image data per a band and for generating compressed bitmap image data.

Namely, since both of the image processing sections 121 and 122 are connected with the printer engine 140, it becomes possible that the image processing sections 121 and 122 can not only share the processing timing of the image transform processing but also share the image output processing. It becomes also possible for the image transform processing and the image output processing to share a processing timing.

Since a plurality of bridges 107/108 and a plurality of generic buses 100B/100C are separately used for different purposes in parallel in the image transform processing and the image output processing, it becomes possible to improve the image processing speed without replacing the generic bus to high performance generic bus.

Accordingly, the fifth embodiment has resolved the problems associated with the prior art, which is the data transmission speed (bandwidth) of the PCI bridge and the PCI bus becomes a bottleneck and an obstacle of high-speed data transmission. As a result, the problems that the productivity of image formation (the number of output sheet of image formation per a unit time) is limited by the data transmission speed (bandwidth) of PCI bridge and this PCI bus also have been eliminated.

The Sixth Embodiment

Figure 16:
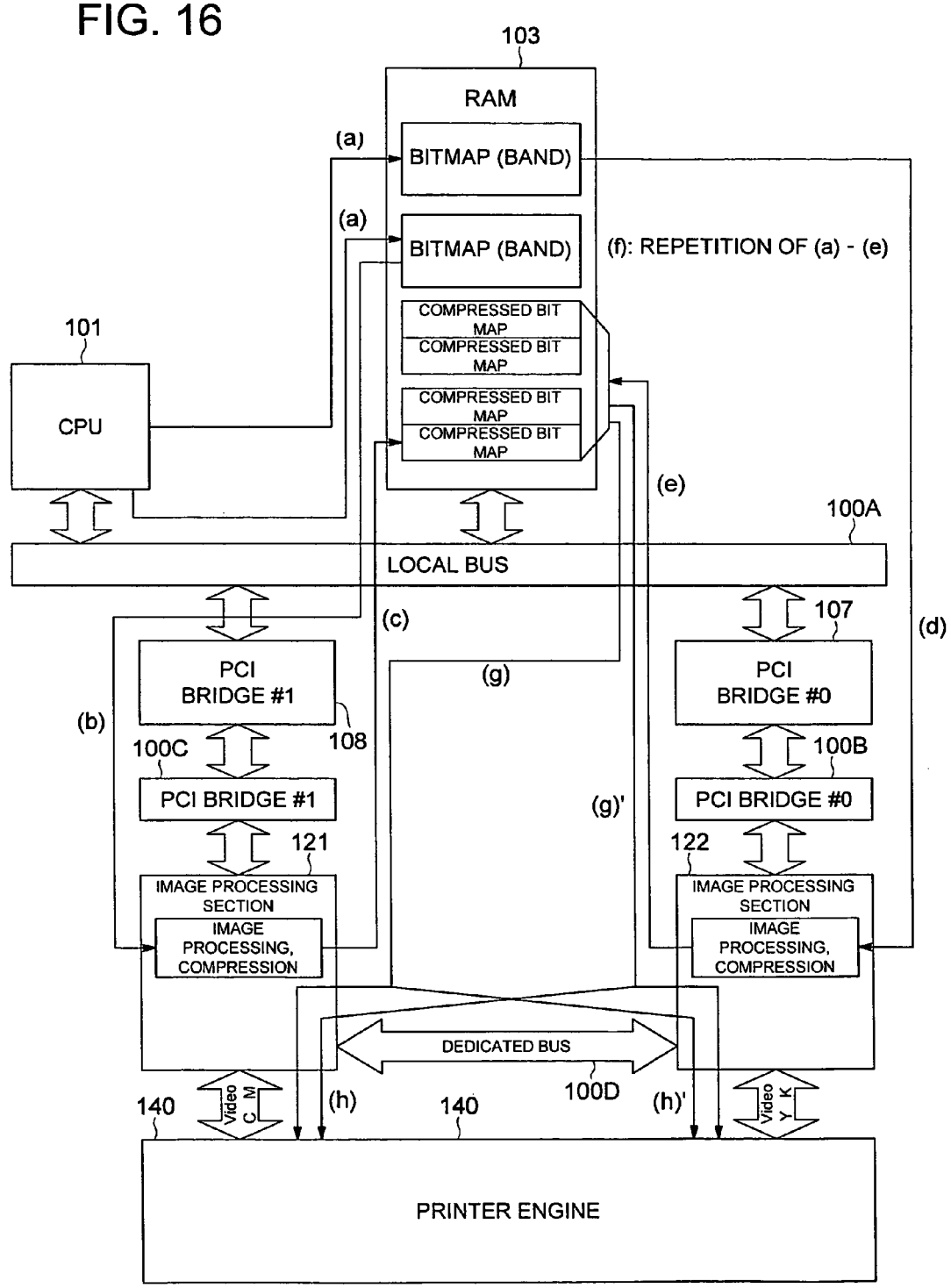
FIG. 16 illustrates a block diagram for showing the configuration and the operations of the image forming apparatus of the sixth embodiment of the present invention.
Figure 17:
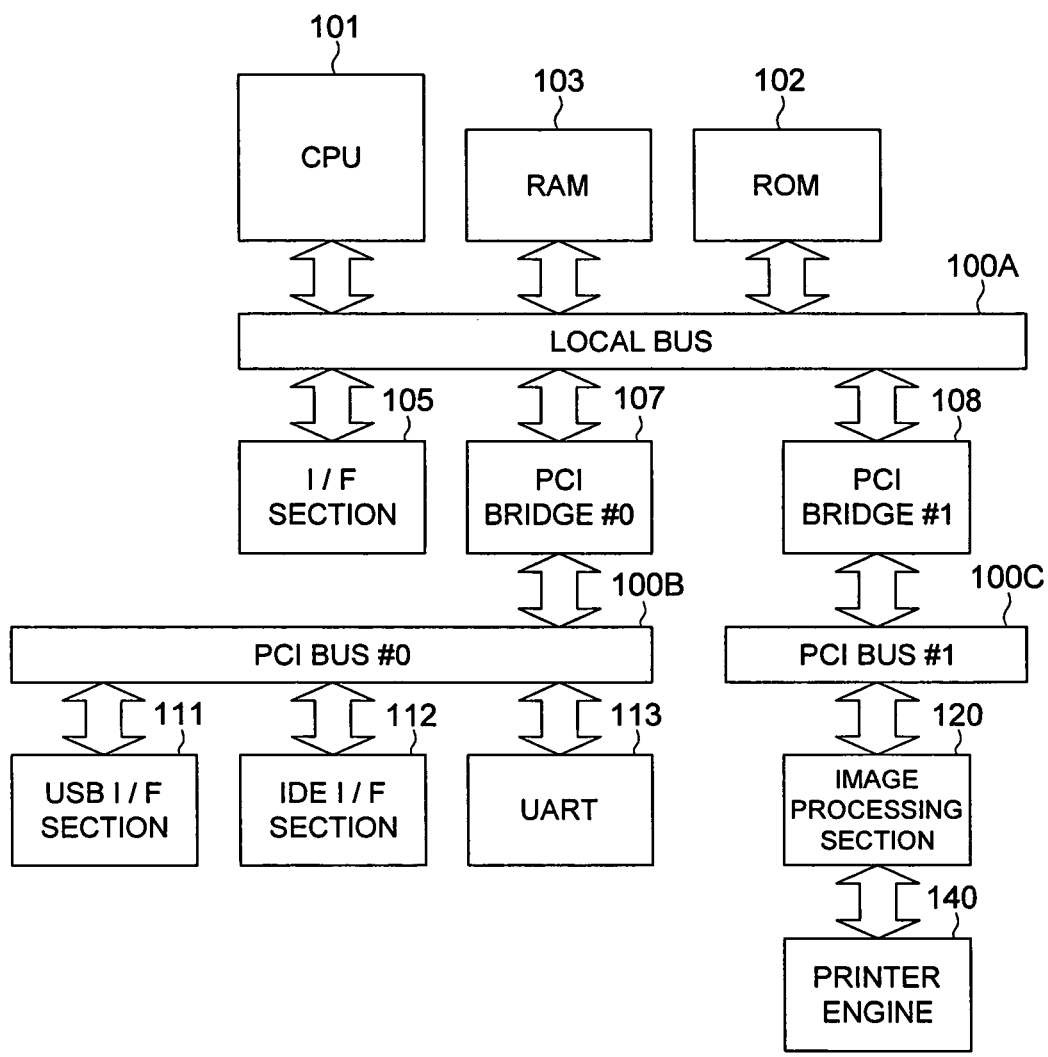
FIG. 17 illustrates a block diagram for showing the configuration and the operations of a conventional image forming apparatus.
Figure 18:
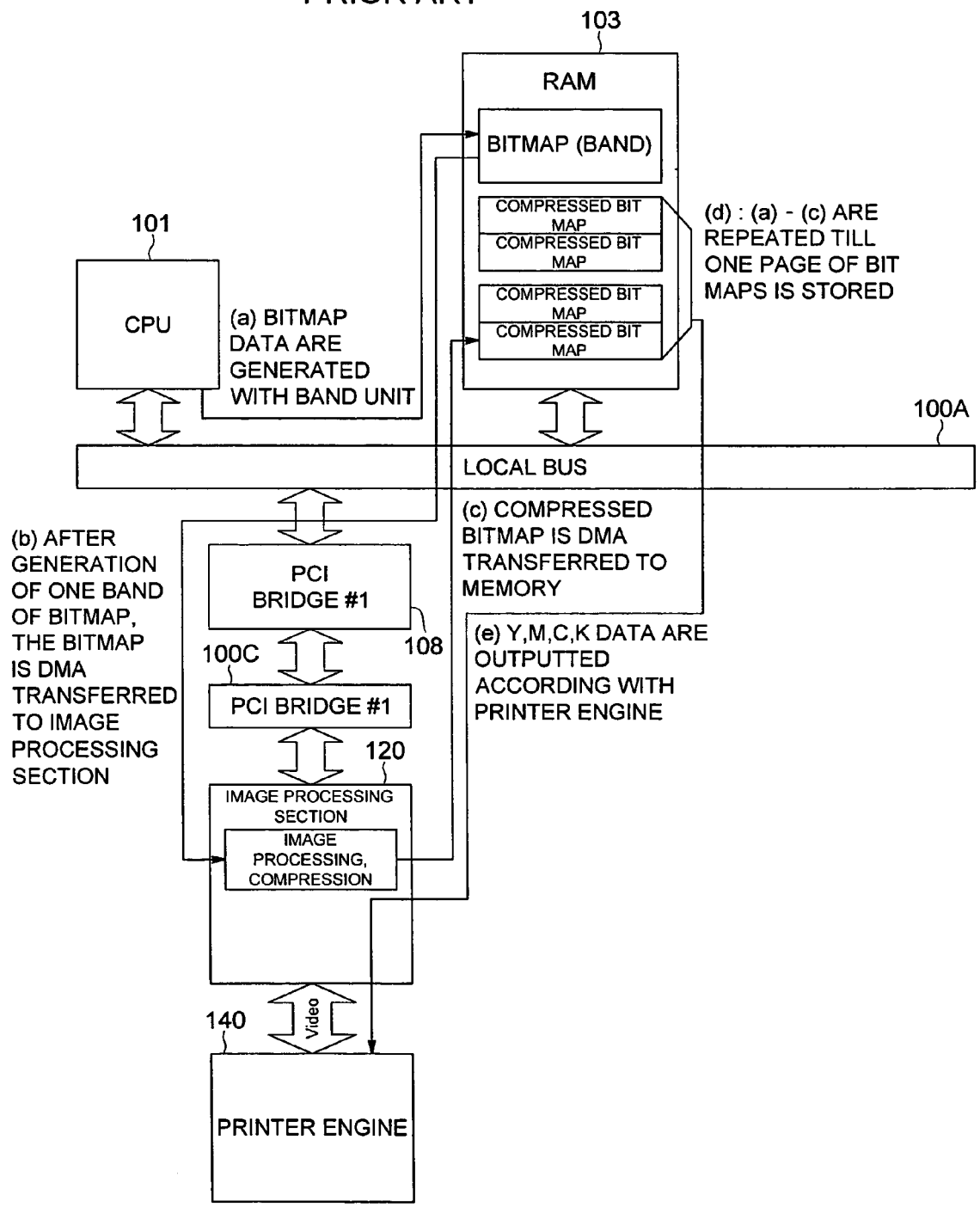
FIG. 18 illustrates a block diagram for showing the configuration and the operations of a conventional image forming apparatus.
Figure 19:
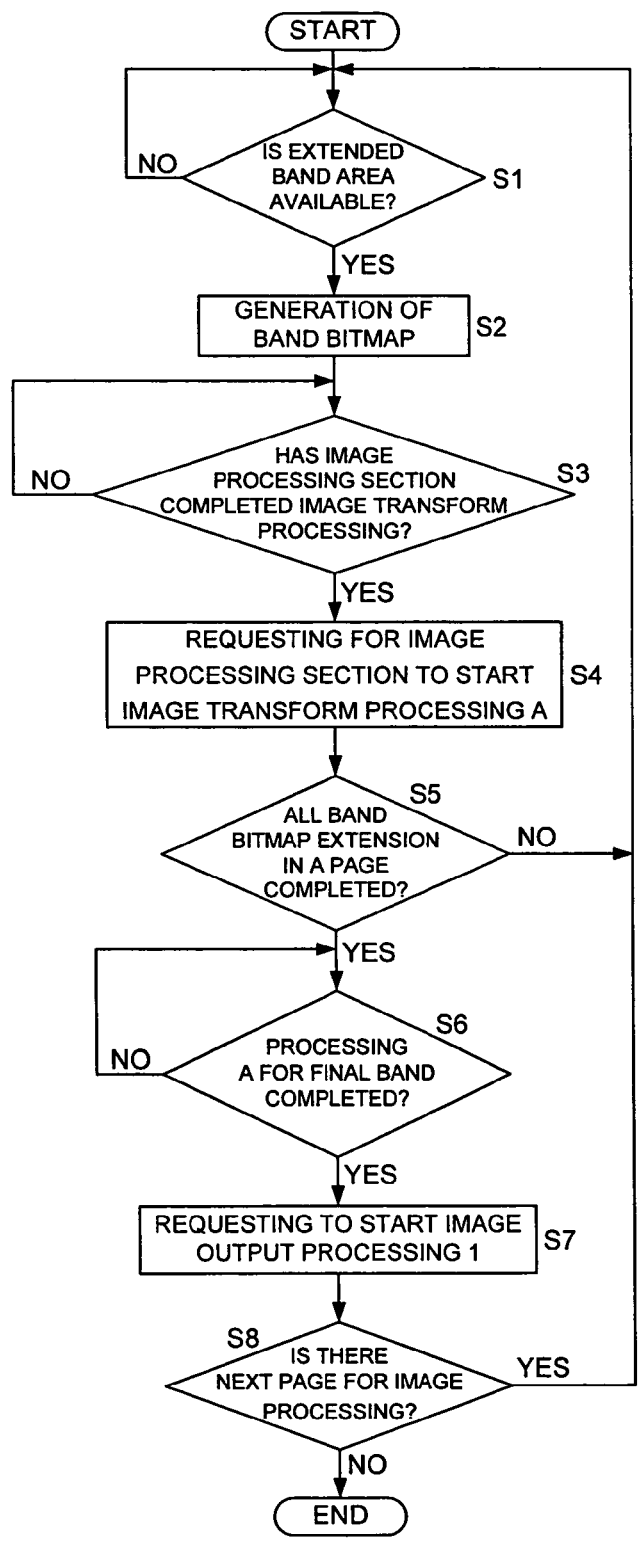
FIG. 19 illustrates a block diagram for showing the configuration and the operations of a conventional image forming apparatus.
Figure 20:
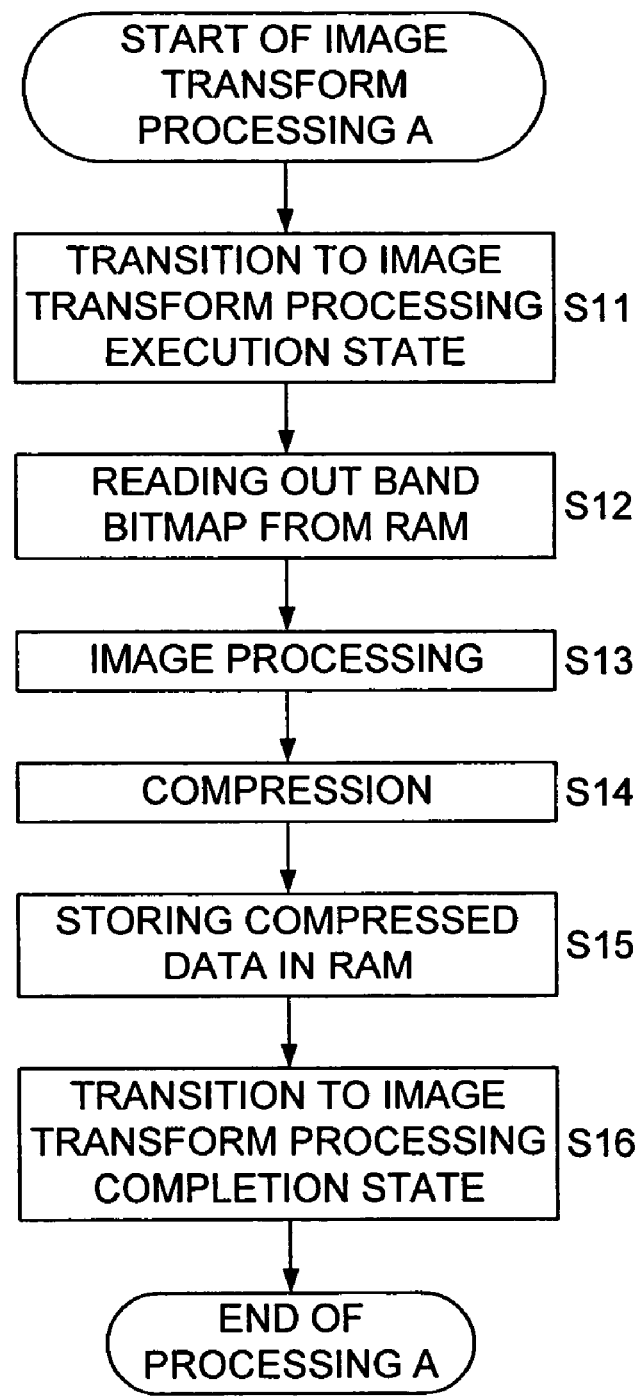
FIG. 20 illustrates a flowchart for showing the operations of the conventional image forming apparatus.
Figure 21:
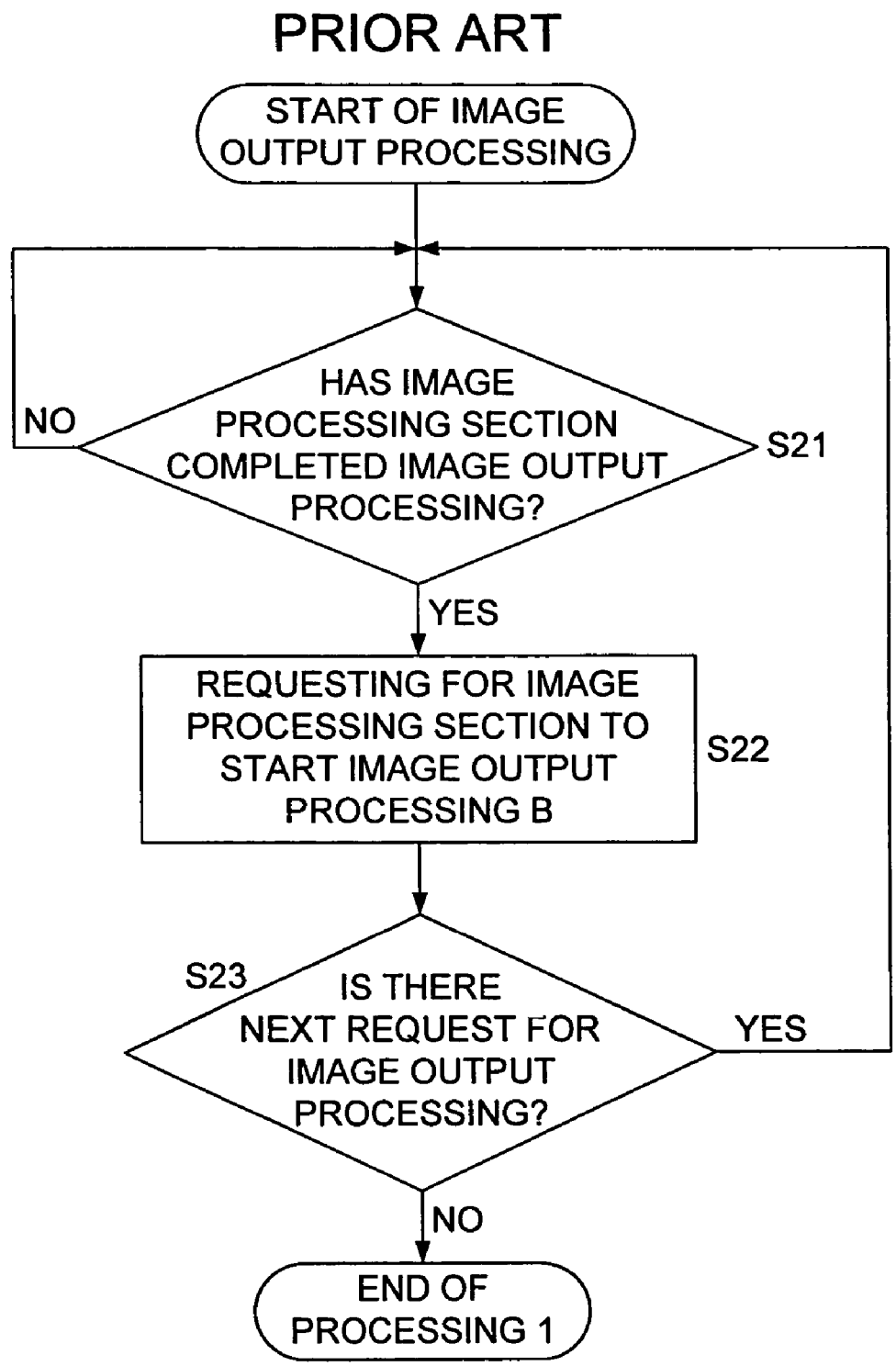
FIG. 21 illustrates a flowchart for showing the operations of the conventional image forming apparatus.
Figure 22:
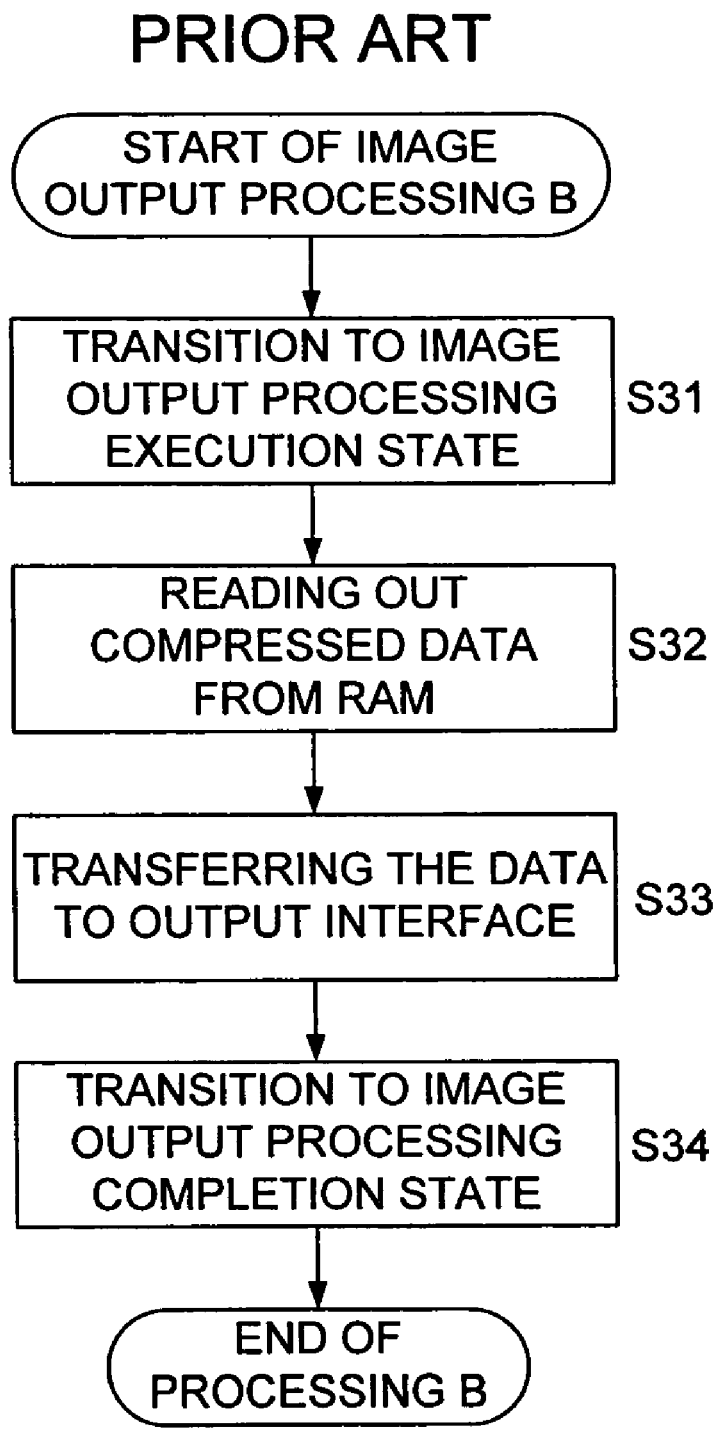
FIG. 22 illustrates a flowchart for showing the operations of the conventional image forming apparatus.

FIG. 16 illustrates a block diagram for showing the configuration of the image forming apparatus of the sixth embodiment of the present invention. In FIG. 16 duplicated descriptions will be eliminated by allotting the same number to the same part used in the FIG. 1 in the first embodiment.

In the sixth embodiment illustrated in FIG. 16, the image processing section 121 as an image processing hardware #1 and the image processing section 122 as an image processing hardware #2 are separately connected with the printer engine 140 through video ports. In this case, the printer engine 140 may include two input ports.

In the sixth embodiment, the image processing section 121 as an image processing hardware #1 and the image processing section 122 as an image processing hardware #2 are connected each other through a dedicated bus 100D. The dedicated bus 100D is designed to have the same data transmission speed of PCI bus.

Namely, in the sixth embodiment, a plurality of independent generic buses 100B and 100C are independently connected with a plurality of image processing sections 121 and 122. The plurality of image processing sections 121 and 122 has functions for executing a predetermined image process and a predetermined compression process at least to the bitmap image data, and further generating compressed bitmap image data as processed image data. The image processing sections 121 and 122 need not always to have the same functions and may have the minimum functions for executing processes described later.

The CPU 101 works as an interpreter and generates image data having expanded bitmap format when the CPU 101 receives the image data of various formats from an outside apparatus (not shown). Here, the CPU 101 generates the bitmap image data per a band, which is one of the plural bands into which one page image data are divided, in order to swiftly execute image processing in each section.

Firstly, the CPU 101 checks whether the space area of an expanded band area in the RAM 103 for storing bitmap image data is available. If space area is available, then the CPU 101 stores the bitmap image data divided into the band unit into the RAM 103 ((a) in FIG. 16).

Then, the CPU 101 checks the operation state of the image processing section 121. The image processing section 120 comprises functions for executing an image transform processing A for generating processed image data having a compressed bitmap format by compressing image data having an expanded bitmap format and for executing an image transformation processing B for generating output image data from the processed image data. When the image processing section 121 is in the state that the image processing section 121 has completed the image transform processing A (image transform processing completion state), the CPU 101 requests the image processing section 121 to start the image transform processing A.

If the image processing section 121 is in the state the image processing section 121 has completed the image transform processing A (image transform processing completion state), the CPU 101 checks the operation state of the image forming section 122. The image processing section 122 has a function for executing an image transform processing A for compressing the expanded bitmap image data to generate processed image data having a compressed bitmap format and a function for executing an image output processing B for generating output image data from the processed image data having compressed bitmap format. If the image processing section 122 is in a state that the image processing section 122 has completed the image transform processing A (image transform processing completion state), then the CPU 101 requests image processing section 122 to start the image transform processing A.

Here, either the image processing section 121 or 122 shifts to a state that either the image processing section 121 or 122 is under image transforms processing. And either the image processing section 121 or 122 reads out the bitmap image data per a band from the RAM 103.

Namely, when the CPU 101 issues the request of the image transform processing A to the image processing section 121, the bitmap image data per a band are transmitted from the RAM 103 to the image processing section 121 in a DMA mode through the local bus 100A, the PCI bridge 108 and PCI bus 100C ((b) in FIG. 16).

When the CPU 101 issues the request of the image processing A to the image processing section 122, bitmap image data per a band are transmitted from RAM 103 to the image processing section 122 in a DMA mode through the local bus 100A, the PCI bridge 107 and the PCI bus 100B ((d) in FIG. 16).

Either the image processing section 121 or 122 applies a predetermined image processing and a predetermined compression processing to bitmap image data per a band and generates compressed bitmap image data as compressed image data. Either the image processing section 121 or 122 stores the compressed bitmap image data generated from the bitmap image data per a band into the area for compressed bitmap image data in the RAM 103.

Namely, when the image processing section 121 executes the image processing and the compression processing, compressed bitmap image data per a band are transmitted from the image processing section 121 to the RAM 103 in a DMA mode through the PCI bus 100C, the PCI bridge 108 and the local bus 100A ((c) in FIG. 16). Then, the image processing section 121 shifts to an image transform processing completion state.

When the image processing section 122 executes the image processing and the compression processing, compressed bitmap image data per a band are transmitted from the image processing section 122 to the RAM 103 in a DMA mode through the PCI bus 100B, the PCI bridge 107 and the local bus 100A ((e) in FIG. 16). Then, the image processing section 122 shifts to an image transform processing completion state.

After the DMA transmission described above is executed, the CPU 101 deletes the bitmap image data per a band in the RAM 103, which has been transmitted. Otherwise, when the image processing section 121 or 122 reads out the bitmap image data per a band, the CPU 101 deletes the bitmap image data per a band which have been transmitted, by way of a move command, not a copy command.

Further, the CPU 101 generates expanded bitmap image data of a plurality of bands corresponding to one page image data. The CPU 101 determines whether the CPU 101 has completed the generation of bitmap image data of all the bands in the one page. If all bitmap image data per a band in one page have not been generated, the CPU 101 checks whether the space area for storing bitmap image data is available in the RAM 103. When the space area is available, the CPU 101 stores the next bitmap image data per a band into the RAM 103 ((*a*) in FIG. 16).

Operation state check of the image processing section 121 or 122 by the CPU 101, a request for the image processing section 121 or 122 to start the image transform processing A by the CPU 101, an image transform processing by the image processing section 121 or 122 and compress bitmap image data transmission from the image processing section 121 or 122 to the RAM 103 are repeated per a band over the bitmap image data of all bands in a page.

In the sixth embodiment, since when either the image processing section 121 or 122 is in an image processing state, the other image processing section which has completed the image transformation is selected to start the image processing, it becomes possible that a plurality of image processing sections can alternately execute image processing while sharing a processing timing per a band.

When the CPU 101 completes the image transform processing per a band on all band bitmap image data in a page, the CPU 101 issues a start-request of an image output processing 1 both to the image processing sections 121 and 122 according to the image formation color of the printer engine 140.

Here, the CPU 101 requests the image processing section 121 to start image output processing B if the image formation color of the printer engine 140 is C (Cyan) or M (Magenta). If the image formation color of the printer engine 140 is Y (Yellow) or K (Black), the CPU 101 requests the image forming section 122 to start image output processing B.

The image processing section 121, which has received the image output processing B from the CPU 101 shifts to an image output processing execution state and reads out compressed bitmap image data of C or M from the RAM 103. The image processing section 122, which has received the image output processing B from the CPU 101 shifts to an image output processing execution state and reads out compressed bitmap image data of Y or K from the RAM 103.

Namely, either the image processing section 121 or 122 transmits compressed bitmap image data through a video port to the printer engine 140 corresponding to the image formation color order per a color and per a page.

The CPU 101 checks whether there is next image data when completing the image formation of all one-page image data. If there is next image data, the CPU 101 repeats the processes. If there is no next image data, the CPU 101 completes all processes and shifts to a completed state.

In the sixth embodiment, the image processing sections 121 and 122 are connected each other through a dedicated bus 100D. Since the other image processing section which has completed image output processing, is arranged to be selected and start image output processing, a plurality of image processing sections alternatively executes image output processing ((g) and (g') in FIG. 16).

In the sixth embodiment, the image processing sections 121 and 122 are connected each other through a dedicated bus 100D and are separately connected with the printer engine 140 through video ports thereof. Based on this configuration, when any one of the PCI bus and the PCI bridge in one side or either the image processing section 121 or 122 is under image-processing, a plurality of image processing sections is arranged to alternatively execute image output processing ((g), (g'), (h) and (h') in FIG. 16).

When any one of the image processing section 121, the PCI bridge 108 and the PCI bus 100C is under execution of processing for a certain task at the timing when the image formation color is M or C, it is possible for the PCI bridge 107, the PCI bus 100B and the image processing section 122 to execute the image output processing and to transmit the output image data from the image processing section 122 to the printer engine 140 through the dedicated bus 100D and the image processing section 121 ((*h*) in FIG. 16).

Namely, when any one of the image processing section 122, the PCI bridge 107 and the PCI bus 100B is under execution of processing for a certain task at the timing when the image formation color is Y or K, it is possible for the PCI bridge 108, the PCI bus 100C and the image processing section 121 to execute the image output processing and to transmit the output image data from the image processing section 121 to the printer engine 140 through the dedicated bus 100D and the image processing section 122 ((h') in FIG. 16).

In the configurations and the operations described above, the image processing sections 121 and 122 alternatively execute image transform processing and image output processing in parallel. As a result, since a plurality of image processing sections 121 and 122 execute image processing while sharing a processing timing per a band, a processing timing of the image transform processing and the image output processing and further an image output processing per a color, a plurality of bridges 107/108 and a plurality of generic buses 100B/100C are alternatively used. Consequently, it becomes possible to improve image processing speed without replacing the generic bus to high performance generic bus.

Further, in the configurations and the operations described above, when executing an image formation of plural pages, if the image processing section 122 is executing image output processing while the printer engine 140 is under execution of the image formation, the image processing section 121 is arranged to play roles for reading out bitmap image data per a band and for generating compressed bitmap image data. Further, in the configurations and the operations described above, when executing an image formation of plural pages, if the image processing section 121 is executing image output processing while the printer engine 140 is under execution of the image formation, the image processing section 122 is arranged to play roles for reading out bitmap image data per a band and for generating compressed bitmap image data.

Namely, by connecting the image processing sections 121 and 122 through the dedicated but 100D and at the same time connecting the image processing sections 121 and 122 with the printer engine 140, it becomes possible for the image processing sections 121 and 122 to share not only a processing timing of image transform processing but also image output processing. It also becomes possible to share a processing timing between the image transform processing and the image output processing.

Since a plurality of bridges 107/108 and a plurality of generic buses 100B/100C are separately used for different purposes in parallel in the image transform processing and the image output processing, it becomes possible to improve the image processing speed without replacing the generic bus to high performance generic bus.

Accordingly, the sixth embodiment has resolved the problems associated with the prior art, which are the data transmission speed (bandwidth) of the PCI bridge and the PCI bus becomes a bottleneck and an obstacle of high-speed data transmission. As a result, the problems that the productivity of image formation (the number of output sheet of image formation per a unit time) is limited by the data transmission speed (bandwidth) of PCI bridge and this PCI bus also have been eliminated.

Other Embodiments

In the embodiments described above, the PCI bus is used as a generic bus. However, the present invention is not limited to the above embodiments and various changes and modifications may be made without departing from the scope of the invention.

In the embodiments of an image processing apparatus or an image processing apparatus, a plurality of independent generic buses is separately connected with a plurality of image processing sections. The plurality of image processing sections is connected with local bus through a plurality of bridges. Each of the image processing sections of the plurality of image processing sections executes image processing by sharing tasks associated with the image processing and stores the processed image data.

A unit of image data, which the controller sets and a plurality of image processing sections shares and processes, is a band unit of the plural bands into which one page data are divided. The plurality of image processing sections shares a processing timing and processes image data. The plurality of image processing sections also repeats the process of allotted image data per a band until one page processed image data have been stored into a memory section.

As a result, since the plurality of image processing sections executes image processing while sharing a processing timing per a band, a plurality of bridges and a plurality of generic buses are alternatively used. It becomes possible to improve the image processing speed without replacing generic bus to high-performance generic bus.

An image forming section is arranged to connect with one of the plurality of image processing sections. The image processing section with which the image forming section is not connected, is arranged to generate processed image data and the image processing section with which the image forming section is connected, is arranged to transmit the processed image data to the image forming section. Based on these configurations, a plurality of bridges and a plurality of generic buses can be used for different purposes in parallel. As a result, it becomes possible to improve the image processing speed without replacing generic bus to high-performance generic bus.

Further, by connecting a plurality of image processing sections through a dedicated bus, even though the image processing section with which the image forming section is not connected, the image processing section being not executing image processing, it reads out processed image data from the memory section and transmits the processed image data to an image processing section with which the image forming section is connected through the dedicated bus, when the plurality of image processing sections executes image processing while sharing a processing timing per a band. Accordingly, since the plurality of bridges and the plurality of generic buses are to be used for different purposes, it becomes possible to improve the image processing speed without replacing generic bus to high-performance generic bus.

What is claimed is:

1. An image processing apparatus comprising:
   a controller for generating expanded image data;
   a local bus connected with the controller;
   a first generic bus and a second generic bus which are independent from each other and each of which has a data transmission speed lower than that of the local bus and which are provided outside of any image processing section;
   a first image processing section being directly connected to the first generic bus and not connected to the second generic bus, and a second image processing section being directly connected to the second generic bus and not connected to the first generic bus, for executing image processing of the expanded image data to generate processed image data, wherein the first and second image processing sections are configured with independent hardware from each other;
   a first bridge which connects the local bus with the first generic bus, and a second bridge which connects the local bus with the second generic bus; and
   a memory section, being connected to the local bus, for storing at least one of the expanded image data and the processed image data,
   wherein the first and second image processing sections share execution of image processing of the expanded image data generated by the controller, and the memory section memorizes the processed image data;
   wherein the controller controls to make a time-sharing between an access of the first image processing section to the memory section through the first generic bus, the first bridge and the local bus, and an access of the second image processing section to the memory section through the second generic bus, the second bridge and the local bus.

2. The image processing apparatus of claim 1, wherein the first and second image processing sections share execution of image processing of the expanded image data with a unit of one band of the expanded image data, wherein one page image data are divided into plural bands of data.

3. The image processing apparatus of claim 2, wherein each of the first and second image processing sections repeats the image processing of shared expanded image data with one band unit until processing of one page image data is completed and one page processed image data are stored into the memory section.

4. The image processing apparatus of claim 1, wherein the first and second image processing sections execute image processing of the expanded image data while sharing processing timings.

5. The image processing apparatus of claim 1, wherein the first and second image processing sections readout the processed image data from the memory section while sharing processing timings.

6. The image processing apparatus of claim 1, wherein the first and second image processing sections are connected each other with an exclusive bus.

7. The image processing apparatus of claim 1, wherein one of the first and second bridges is selectively connected to the local bus, and
wherein each of the first and second image processing sections accesses to the memory section when a corresponding one of the bridges is connected to the local bus.

8. The image processing apparatus of claim 1, wherein one of the first and second image processing sections is connected to an image forming section, and
wherein the controller controls to concurrently execute an image output processing by the image processing section connected to the image forming section, and the image processing to generate processed image data by the image processing section not connected to the image forming section.

9. An image forming apparatus comprising:
a controller for generating expanded image data;
a local bus connected with the controller;
a first generic bus and a second generic bus which are independent from each other and each of which has a data transmission speed lower than that of the local bus and which are provided outside of any image processing section;
a first image processing section being directly connected to the first generic bus and not connected to the second generic bus, and a second image processing section being directly connected to the second generic bus and not connected to the first generic bus, for executing image processing of the expanded image data to generate processed image data, wherein the first and second image processing sections are configured with independent hardware from each other;
a first bridge which connects the local bus with the first generic bus, and a second bridge which connects the local bus with the second generic bus;
a memory section, being connected to the local bus, for storing at least one of the expanded image data and the processed image data; and
an image forming section connected to anyone of the first and second image processing sections,
wherein the first and second image processing sections share execution of image processing of the expanded image data generated by the controller, and the memory section memorizes the processed image data;
wherein the controller controls to make a time-sharing between an access of the first image processing section to the memory section through the first generic bus, the first bridge and the local bus, and an access of the second image processing section to the memory section through the second generic bus, the second bridge and the local bus.

10. The image forming apparatus of claim 9, wherein the first and second image processing sections share execution of image processing of the expanded image data with one band unit of the expanded image data, wherein one page image data are divided into plural bands of data.

11. The image forming apparatus of claim 10, wherein each of the first and second image processing sections repeats the image processing of shared expanded image data with one band unit until processing of one page image data is completed and one page processed image data are stored into the memory section.

12. The image forming apparatus of claim 9, wherein the first and second image processing sections execute image processing of the expanded image data while sharing processing timings.

13. The image forming apparatus of claim 9, wherein the first and second image processing sections transmit the processed image data while sharing processing timings.

14. The image processing apparatus of claim 9, wherein the first and second image processing sections are connected each other with an exclusive bus.

15. The image forming apparatus of claim 9, wherein the controller controls to concurrently execute an image output processing by the image processing section connected to the image forming section, and the image processing to generate processed image data by the image processing section not connected to the image forming section.

* * * * *